(12) United States Patent
Lee et al.

(10) Patent No.: US 10,607,060 B2
(45) Date of Patent: Mar. 31, 2020

(54) ELECTRONIC DEVICE AN OPERATING METHOD THEREOF

(71) Applicant: Samsung Electronics Co., Ltd., Suwon-si, Gyeonggi-do (KR)

(72) Inventors: Chaekyung Lee, Seoul (KR); Jiwon Kim, Seoul (KR); Won Lee, Seoul (KR); Bo-Keun Kim, Suwon-si (KR); Inkyeong Shin, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 15/821,269

(22) Filed: Nov. 22, 2017

(65) Prior Publication Data
US 2018/0157893 A1  Jun. 7, 2018

(30) Foreign Application Priority Data

Dec. 1, 2016 (KR) .................. 10-2016-0162649

(51) Int. Cl.
*G06K 9/00* (2006.01)
*G06K 9/20* (2006.01)
*G06F 21/32* (2013.01)

(52) U.S. Cl.
CPC ......... *G06K 9/00087* (2013.01); *G06F 21/32* (2013.01); *G06K 9/00013* (2013.01); *G06K 9/2054* (2013.01)

(58) Field of Classification Search
None
See application file for complete search history.

(56) References Cited

U.S. PATENT DOCUMENTS

| | | |
|---|---|---|
| 9,261,991 B2 | 2/2016 | Alameh et al. |
| 10,061,970 B2 | 8/2018 | Zhou |
| 2014/0079300 A1* | 3/2014 | Wolfer ............... G06K 9/00013 382/124 |
| 2014/0333328 A1 | 11/2014 | Nelson et al. |
| 2015/0135108 A1 | 5/2015 | Pope et al. |

(Continued)

FOREIGN PATENT DOCUMENTS

| | | |
|---|---|---|
| CN | 106096359 A | 11/2016 |
| KR | 10-2015-0092964 A | 8/2015 |

OTHER PUBLICATIONS

Australian Office Action dated Jan. 24, 2020; Australian Appln. No. 2017366960.

(Continued)

*Primary Examiner* — Randolph I Chu
(74) *Attorney, Agent, or Firm* — Jefferson IP Law, LLP

(57) ABSTRACT

An apparatus and method for setting a fingerprint recognition region in an electronic device are provided. An electronic device includes a display, a finger scan sensor overlapped with at least a partial region of the display, and a processor. The processor controls to detect a touch input for at least one object displayed at the display, when detecting a first fingerprint image through a fingerprint recognition region corresponding to the touch input, enlarge a size of the fingerprint recognition region, detect a second fingerprint image through the enlarged fingerprint recognition region, and when having succeeded in user authentication by using the second fingerprint image, perform a function corresponding to the at least one object.

20 Claims, 26 Drawing Sheets

(56) References Cited

U.S. PATENT DOCUMENTS

| | | |
|---|---|---|
| 2015/0220767 A1 | 8/2015 | Yoon et al. |
| 2015/0348001 A1* | 12/2015 | Van Os .................. G06Q 20/40 705/44 |
| 2015/0363632 A1 | 12/2015 | Ahn et al. |
| 2015/0371073 A1 | 12/2015 | Cho et al. |
| 2016/0092018 A1 | 3/2016 | Lee et al. |
| 2016/0171281 A1 | 6/2016 | Park et al. |
| 2018/0276356 A1* | 9/2018 | Kim ........................ G06F 21/32 |

OTHER PUBLICATIONS

European Search Report dated Oct. 23, 2019; European Appln. No. 17875397.6-1207/3545454 PCT/KR2017013943.

* cited by examiner

ELECTRONIC DEVICE AN OPERATING METHOD THEREOF

CROSS-REFERENCE TO RELATED APPLICATION(S)

This application claims the benefit under 35 U.S.C. § 119(a) to a Korean patent application filed on Dec. 1, 2016 in the Korean Intellectual Property Office and assigned Serial No. 10-2016-0162649, the entire disclosure of which is hereby incorporated by reference.

TECHNICAL FIELD

The present disclosure relates to an apparatus and method for setting a fingerprint recognition region in an electronic device.

BACKGROUND

With the growth of information telecommunication technologies and semiconductor technologies, various electronic devices are developing into multimedia devices providing various multimedia services. For example, the multimedia service may include various services such as a voice call service, a message service, a broadcasting service, a wireless Internet service, a camera service, and a music play service.

The electronic device may store various kinds of private information such as a phone number, authentication information (e.g., identification number) and the like. To protect the private information stored in the electronic device, the electronic device may provide an authentication service. For example, the electronic device may provide an authentication service (e.g., biometric recognition service) utilizing biometric information such as an iris, a fingerprint, a face, a palm line, a vein, etc.

The above information is presented as background information only to assist with an understanding of the present disclosure. No determination has been made, and no assertion is made, as to whether any of the above might be applicable as prior art with regard to the present disclosure.

SUMMARY

An electronic device can acquire a user's biometric information (e.g., fingerprint information) for user authentication, by using a medical sensor (e.g., a finger scan sensor) operatively coupled with the electronic device. For example, when detecting a user input for user authentication, the electronic device can activate the finger scan sensor. The electronic device can acquire a user's fingerprint information, based on the user's additional input to the finger scan sensor.

To perform user authentication utilizing biometric information, the electronic device requires many user inputs and therefore, can result in an inconvenience to the user who utilizes a biometric recognition service.

Also, when the electronic device detects a user's fingerprint information by using a finger scan sensor installed in the entire or at least a partial region of a display, a problem that power is unnecessarily consumed can take place, because even a finger scan sensor of a region not related with fingerprint recognition is activated.

Aspects of the present disclosure are to address at least the above-mentioned problems and/or disadvantages and to provide at least the advantages described below. Accordingly, an aspect of the present disclosure is to provide an apparatus and method for providing various user interfaces by using fingerprint information on a user input for an object in an electronic device.

Another aspect of the present disclosure is to provide an apparatus and method for adaptively setting a fingerprint recognition region in an electronic device.

In accordance with an aspect of the present disclosure, an electronic device is provided. The electronic device includes a display, a finger scan sensor overlapped with at least a partial region of the display, and a processor. The processor may control to detect a touch input for at least one object displayed at the display, when detecting a first fingerprint image through a fingerprint recognition region corresponding to the touch input, enlarge a size of the fingerprint recognition region, detect a second fingerprint image through the enlarged fingerprint recognition region, and, when having succeeded in user authentication by using the second fingerprint image, perform a function corresponding to the at least one object.

In accordance with an aspect of the present disclosure, an operating method of an electronic device is provided. The operating method includes detecting a touch input for at least one object displayed at a display of the electronic device, checking whether a first fingerprint image is detected through a fingerprint recognition region corresponding to the touch input, when detecting the first fingerprint image, enlarging a size of the fingerprint recognition region, detecting a second fingerprint image through the enlarged fingerprint recognition region, and, when having succeeded in user authentication by using the second fingerprint image, performing a function corresponding to the at least one object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
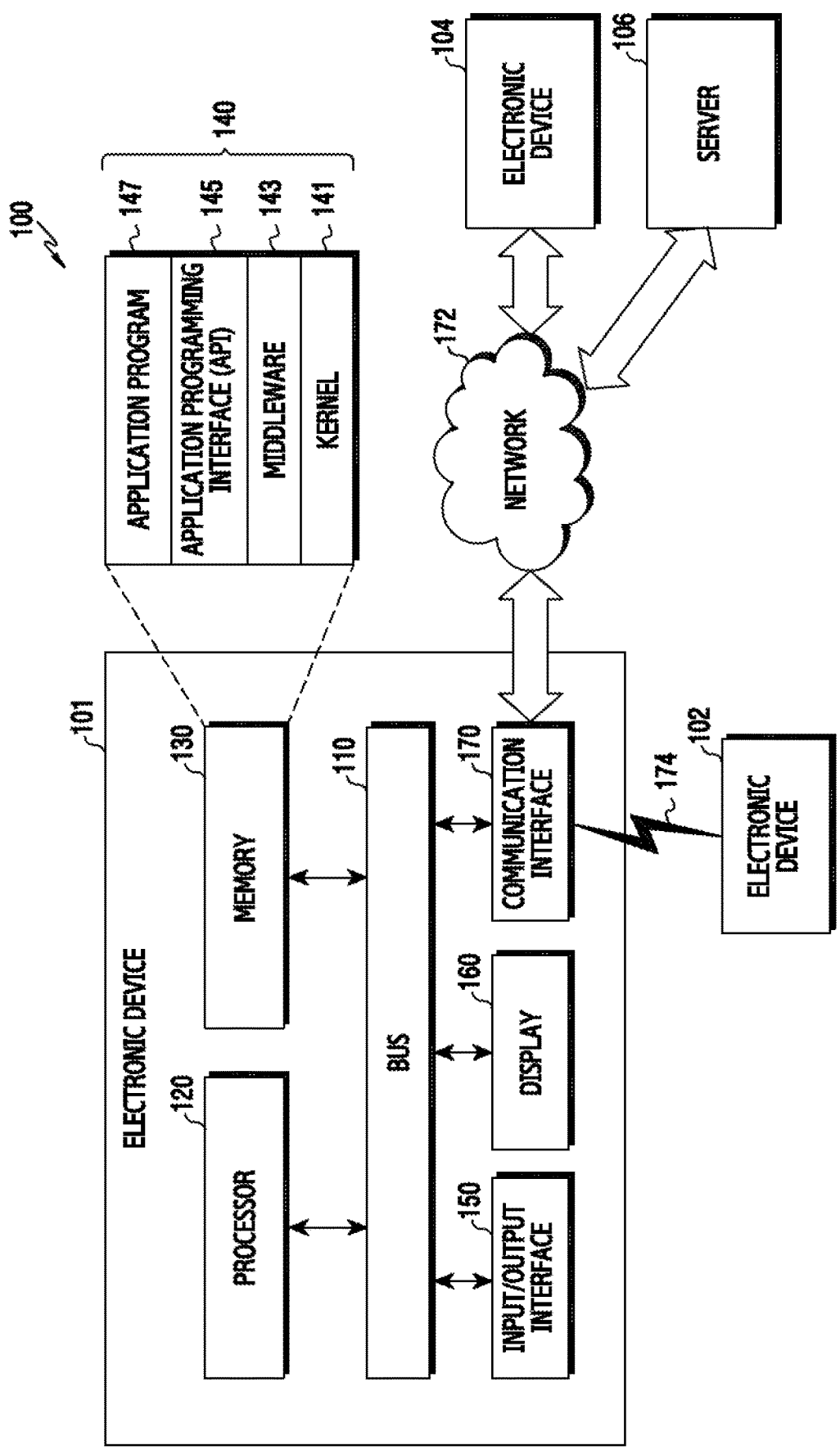
FIG. 1A illustrates an electronic device within a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor (AP)) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to various embodiments, the electronic device (ex. home appliance) may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device (or foldable device). Further, the electronic device according to an embodiment of the present disclosure is not limited to the aforementioned devices, and may include a new electronic device according to the development of technology.

FIG. 1A illustrates an electronic device within a network environment in various embodiments of the present disclosure.

Referring to FIG. 1A, an electronic device 101, within a network environment 100, may include a bus 110, a processor 120 (e.g., including processing circuitry), a memory 130, an input output interface 150 (e.g., including input/output circuitry), a display 160 (e.g., including display circuitry), and a communication interface 170 (e.g., including communication circuitry). In various embodiments, the electronic device 101 may omit at least one of the constituent elements or additionally have another constituent element.

The bus 110 may, for example, include circuitry for connecting the constituent elements 120 to 170 with each other and forwarding communication (e.g., a control message and/or data) between the constituent elements.

The processor 120 may include one or more of a CPU, an AP, a communication processor (CP) or an image signal processor (ISP). The processor 120 may, for example, execute an operation or data processing for control and/or communication of at least one other constituent element of the electronic device 101.

According to an embodiment, the processor 120 may set a function corresponding to user authentication to at least one object displayable at the display 160. For example, the processor 120 may set a function for executing through a specific object among a plurality of objects displayable at the display 160 and authentication information (e.g., reference fingerprint information) on the corresponding function. For instance, the function may include at least one of the execution of an application, security setting, the execution of a control menu, and the setting of the control menu.

According to an embodiment, the processor 120 may control the display 160 to display at least one object. For example, the object may include a graphic element configuring a service screen, such as an icon of an application, state information, control menu setting information, and the like.

According to an embodiment, when detecting a touch input for at least one object among a plurality of objects displayed at the display 160, the processor 120 may control to detect a user's fingerprint information corresponding to the touch input. For example, when detecting a touch input corresponding to at least one object displayed at the display 160 through a touch panel, the processor 120 may check whether a fingerprint authentication event occurs. For instance, the processor 120 may determine whether the fingerprint authentication event takes place, based on setting or non-setting of a service corresponding to a touch holding time of an object, a pressure intensity of the object, and user authentication of the object. When detecting the occurrence of the fingerprint authentication event, the processor 120 may set, as a fingerprint recognition region, at least a part of a finger scan sensor corresponding to a touch input for at least one object. The processor 120 may control the finger scan sensor (or fingerprint panel) such that the fingerprint recognition region is activated. For instance, the processor 120 may set, as the fingerprint recognition region, at least a part of the finger scan sensor which is overlapped with a region where the touch input for the object has been detected. The processor 120 may acquire at least a part of a user fingerprint through the fingerprint recognition region of the finger scan sensor.

According to an embodiment, the processor 120 may control a finger scan sensor (or fingerprint panel) to adjust a size of a fingerprint recognition region. For example, the processor 120 may check whether a fingerprint image is detected through a fingerprint recognition region corresponding to a touch input for at least one object. When acquiring the fingerprint image through the fingerprint recognition region corresponding to the touch input for the object, the processor 120 may control the finger scan sensor (or fingerprint panel) to temporarily enlarge a size of the fingerprint recognition region for the sake of user authentication. For instance, the processor 120 may control the finger scan sensor (or fingerprint panel) to enlarge the size of the fingerprint recognition region to a predefined size, or enlarge the size of the fingerprint recognition region to a size which is determined based on a size of at least one reference fingerprint image. Additionally or alternatively, the processor 120 may determine whether to enlarge the fingerprint recognition region, based on the size of the fingerprint image detected through the fingerprint recognition region corresponding to the touch input for the object. For instance, when the size of the fingerprint image detected through the fingerprint recognition region corresponding to the touch input for the object exceeds a reference size, the processor 120 may restrict the enlargement of the fingerprint recognition region. In this case, the processor 120 may perform user authentication utilizing the fingerprint image acquired through the fingerprint recognition region corresponding to the touch input for the object. For instance, when the size of the fingerprint image acquired through the fingerprint recognition region corresponding to the touch input for the object is equal to or is less than the reference size, the processor 120 may control the finger scan sensor (or fingerprint panel) to enlarge the fingerprint recognition region. That is, the processor 120 may control the finger scan sensor (or fingerprint panel) to enlarge a size of an active region in the finger scan sensor.

According to an embodiment, when failing to acquire a fingerprint image through a fingerprint recognition region corresponding to a touch input for at least one object, the processor 120 may execute a function corresponding to the touch input for the object.

According to an embodiment, the processor 120 may perform user authentication by using fingerprint information detected through an enlarged fingerprint recognition region. For example, the processor 120 may acquire the fingerprint information (i.e., fingerprint image) through the enlarged fingerprint recognition region. By comparing the corresponding fingerprint information and a predefined reference fingerprint image, the processor 120 may perform the user authentication. When succeeding in the user authentication, the processor 120 may execute an operation or function mapped to the user authentication of an object in which a touch input has been detected. Additionally or alternatively, when enlarging a size of the fingerprint recognition region, the processor 120 may control the display 160 to change a display variable (e.g., a color, an illumination, a shadow, etc.) of the fingerprint recognition region such that the fingerprint recognition region is distinguished from a remnant region.

According to an embodiment, when failing in user authentication by using fingerprint information (i.e., fingerprint image) detected through an enlarged fingerprint recognition region, the processor 120 may control to output information corresponding to fingerprint re-authentication. For example, when failing in the user authentication, the processor 120 may control the display 160 to display a message of guiding user re-authentication.

According to an embodiment, when failing in user authentication by using fingerprint information detected through an enlarged fingerprint recognition region, the processor 120 may execute a function corresponding to a touch input for an object.

The memory 130 may include a volatile and/or non-volatile memory. The memory 130 may, for example, store a command or data related to at least one other constituent element of the electronic device 101. According to an embodiment, the memory 130 may store at least one reference fingerprint image for user authentication, and operation or function information mapped to user authentication of an object.

According to an embodiment, the memory 130 may store a software and/or program 140. For example, the program 140 may include a kernel 141, a middleware 143, an application programming interface (API) 145, an application program (or "application") 147 or the like. At least some of the kernel 141, the middleware 143, or the API 145 may be called an operating system (OS).

The kernel 141 may, for example, control or manage system resources (e.g., the bus 110, the processor 120, the memory 130 or the like) which are used for executing operations or functions implemented in other programs (e.g., the middleware 143, the API 145, or the application program 147). Also, the kernel 141 may provide an interface capable of enabling the middleware 143, the API 145, or the application program 147 to access the individual constituent element of the electronic device 101, thereby controlling or managing the system resources of the electronic device 101.

The middleware 143 may, for example, perform a relay role of enabling the API 145 or the application program 147 to communicate and exchange data with the kernel 141. Also, the middleware 143 may process one or more work requests received from the application program 147 in accordance with priority. For example, the middleware 143 may grant at least one of the application programs 147 a priority of utilizing the system resources (e.g., the bus 110, the processor 120, the memory 130, etc.) of the electronic device 101, and process the one or more work requests. The API 145 is, for example, an interface enabling the application program 147 to control a function provided by the kernel 141 or the middleware 143. The API 145 may, for example, include at least one interface or function (e.g., an instruction) for file control, window control, image processing, character control or the like.

The input output interface 150 may, for example, play a role of an interface capable of forwarding a command or data inputted from a user or another external device to the other constituent element(s) of the electronic device 101.

The display 160 may, for example, include a liquid crystal display (LCD), a light emitting diode (LED) display, an organic light emitting diode (OLED) display, a microelectromechanical systems (MEMS) display, or an electronic paper display. For example, the display 160 may display various contents (e.g., a text, an image, a video, an icon, a symbol and/or the like) to a user.

According to an embodiment, the display 160 may include a display panel, a touch panel, a finger scan sensor, and a pressure panel. For example, the display 160 may receive a touch, gesture, proximity or hovering input utilizing an electronic pen or a part of a user's human body, through the touch panel. For instance, the touch panel may detect a user's fingerprint image by enhancing a resolution of a coordinate capable of detecting a user input (i.e., touch) in a capacitive scheme. For example, the finger scan sensor may include a light receiving module, which is disposed adjacent to a plurality of pixels included in the display panel. The finger scan sensor may detect a user's fingerprint image by collecting, through the light receiving module, a value of light emitted from the plurality of pixels included in the display panel and reflected from a part of the user's human body. For instance, the light receiving module may be disposed to correspond to at least one pixel. For example, as will be described with reference to FIG. 1B below, the finger scan sensor may be configured as a separate panel overlapped with the touch panel and detect a fingerprint image as well. For example, the display 160 may, through a pressure panel, receive a pressure input by a part of a user's human body or a nonconductor.

The communication interface 170 may, for example, establish communication between the electronic device 101 and an external device (e.g., a first external electronic device 102, a second external electronic device 104, or a server 106). For example, the communication interface 170 may be connected to a network 172 by a wireless communication or wired communication, to communicate with the external device (e.g., the second external electronic device 104 or the server 106). Similarly, the communication interface 170 may be connected to the electronic device 102 by a wired or wireless communication 174.

The wireless communication may, for example, include a cellular communication that utilizes at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) or the like. According to an embodiment, the wireless communication may, for example, include at least one of Wi-Fi, Bluetooth (BT), Bluetooth low energy (BLE), Zigbee, near field communication (NFC), magnetic secure transmission (MST), radio frequency (RF), or body area network (BAN). According to an embodiment, the wireless communication may include GNSS. The GNSS may, for example, be a GPS, a global navigation satellite system (Glonass), Beidou (Beidou navigation satellite system), or Galileo (the European global satellite-based navigation system). Below, the "GPS" may be used interchangeably with the "GNSS". The wired communication may, for example, include at least one of a universal serial bus (USB), a high definition multimedia interface (HDMI), recommended standard-232 (RS-232), plain old telephone service (POTS) or the like. The network 172 may include a telecommunications network, for example, at least one of a computer network (e.g., local area network (LAN) or wide area network (WAN)), the Internet, or a telephone network.

The first and second electronic devices 102 and 104 each may be a device of the same or different type from that of the electronic device 101. According to various embodiments, all or some of operations executed in the electronic device 101 may be executed in another or a plurality of electronic devices (e.g., the electronic devices 102 and 104 or the server 106). According to an embodiment, when the electronic device 101 has to perform some function or service automatically or by a request, the electronic device 101 may, instead of or additionally to executing the function or service in itself, request at least a partial function associated with this to another device (e.g., the electronic device 102 or 104 or the server 106). The other electronic device (e.g., the electronic device 102 or 104 or the server 106) may execute the requested function or additional function, and forward the execution result to the electronic device 101. The electronic device 101 may process the received result as it is or additionally, thereby providing the requested function or service. For this, a cloud computing, distributed computing, or client-server computing technology may be used, for example.

Figure 1B:
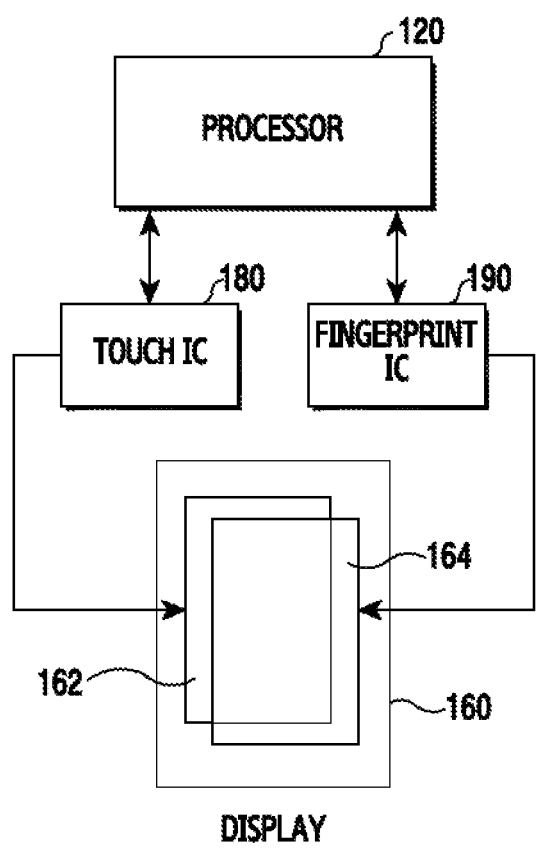
FIG. 1B illustrates a block diagram of an electronic device for processing input information according to various embodiments of the present disclosure.

FIG. 1B illustrates a block diagram of an electronic device for processing input information according to various embodiments of the present disclosure.

Referring to FIG. 1B, the display 160 of the electronic device 101 may include a display panel (not shown) displaying various contents, a touch panel 162 recognizing a touch signal, and a fingerprint panel 164 recognizing a fingerprint image.

A touch integrated circuit (IC) 180 may generate a touch event corresponding to touch information (e.g., touch coordinate) of a touch input detected through the touch panel 162. A fingerprint IC 190 may generate an authentication event corresponding to a fingerprint image detected through the fingerprint panel 164.

The processor 120 may match and process the touch event and the authentication event which are provided from the touch IC 180 and the fingerprint IC 190 respectively. For example, when being provided with occurrence information of the touch event from the touch IC 180, the processor 120 may determine an active region (i.e., fingerprint recognition region) of the fingerprint panel 164. The processor 120 may perform user authentication by using a fingerprint image acquired through the active region of the fingerprint panel 164. When succeeding in the user authentication by using the fingerprint image acquired through the active region of the fingerprint panel 164, the processor 120 may control to perform an operation or function which has been preset to an object of a touch point provided from the touch IC 180.

According to various embodiments of the present disclosure, the electronic device 101 may configure the touch IC 180 and the fingerprint IC 190 as one module as well.

Figure 2:
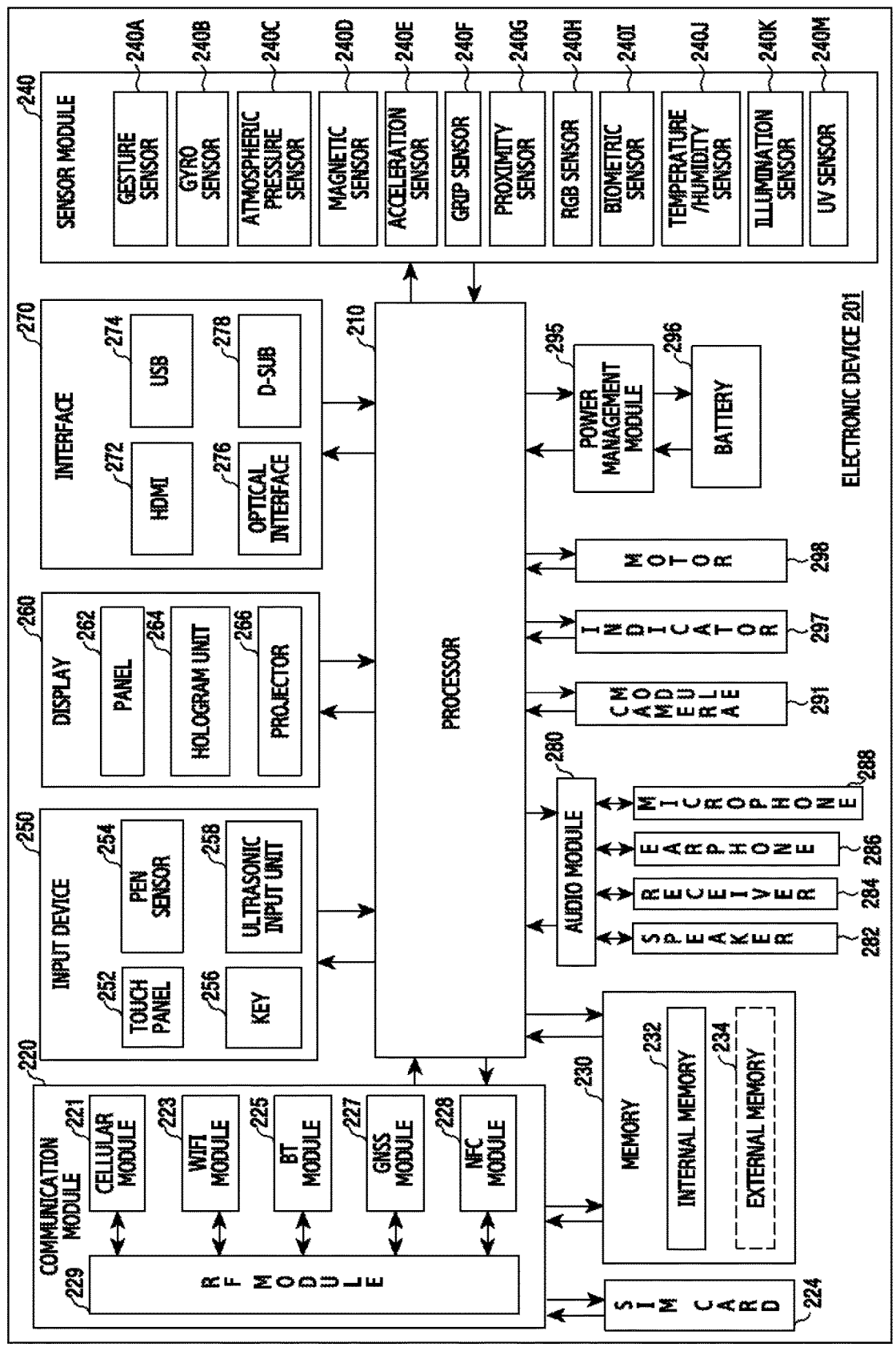
FIG. 2 illustrates a block diagram of an electronic device according to various embodiments of the present disclosure.

FIG. 2 illustrates a block diagram of an electronic device according to various embodiments of the present disclosure.

Referring to FIG. 2, an electronic device 201 may, for example, include the entire or a part of the electronic device 101 shown in FIG. 1A. The electronic device 201 may include one or more processors (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may, for example, operate an OS or an application program, to control a plurality of hardware or software constituent elements connected to the processor 210, and may perform various data processing and operations. The processor 210 may be, for example, implemented as a system on chip (SoC). According to an embodiment, the processor 210 may further include a graphic processing unit (GPU) and/or an ISP. The processor 210 may include at least some (e.g., cellular module 221) of the constituent elements shown in FIG. 2 as well. The processor 210 may load a command or data received from at least one of the other constituent elements (e.g., non-volatile memory) to a volatile memory and process the loaded command or data, and may store the result data in the non-volatile memory.

According to an embodiment, when detecting a touch input for at least one object displayed at the display 260, the processor 210 may set a fingerprint recognition region which is overlapped with a region where the touch input has been detected. When detecting a fingerprint image through the fingerprint recognition region, the processor 210 may enlarge a size of the fingerprint recognition region, and perform user authentication. When succeeding in the user authentication through the enlarged fingerprint recognition region, the processor 210 may control to perform an operation or function matched to an object in which a touch input has been detected.

The communication module 220 may have the same or similar construction as the communication interface 170 of FIG. 1A. The communication module 220 may, for example, include the cellular module 221, a Wi-Fi module 223, a BT module 225, a GNSS module 227, an NFC module 228, and an RF module 229.

The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network by using the subscriber identification module (e.g., SIM card) 224. According to an embodiment, the cellular module 221 may perform at least some functions among functions the processor 210 may provide. According to an embodiment, the cellular module 221 may include a CP.

According to various embodiments, at least some (e.g., two or more) of the cellular module 221, the Wi-Fi module 223, the BT module 225, the GNSS module 227 or the NFC module 228 may be included within one integrated chip (IC) or IC package.

The RF module 229 may, for example, transmit and/or receive a communication signal (e.g., an RF signal). The RF module 229 may, for example, include a transceiver, a power amplifier module (PAM), a frequency filter, a low noise amplifier (LNA), an antenna or the like. According to another embodiment, at least one of the cellular module 221, the Wi-Fi module 223, the BT module 225, the GNSS module 227 or the NFC module 228 may transmit and/or receive an RF signal through a separate RF module. The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., the memory 130 of FIG. 1A) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme digital (xD), a multi media card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature-humidity sensor 240J, an illumination sensor 240K, or an ultra violet (UV) sensor 240M. Additionally or alternatively, the sensor module 240 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuitry for controlling at least one or more sensors belonging therein. In various embodiments, the electronic device 201 may further include a processor configured to control the sensor module 240 as a part of the processor 210 or separately, to control the sensor module 240 while the processor 210 is in a sleep state.

The input device 250 may, for example, include a touch panel 252, a (digital) pen sensor 254, a key 256, or an ultrasonic input device 258. The touch panel 252 may, for example, use at least one scheme among a capacitive overlay scheme, a pressure sensitive scheme, an infrared beam scheme, or an ultrasonic scheme. Also, the touch panel 252 may further include a control circuitry as well. The touch panel 252 may further include a tactile layer, to provide a tactile response (i.e., a touch coordinate) to a user. The (digital) pen sensor 254 may, for example, be a part of the touch panel 252, or include a separate sheet for recognition. The key 256 may, for example, include a physical button, an optical key, or a keypad. The ultrasonic input device 258 may detect an ultrasonic wave generated in an input tool through a microphone (e.g., a microphone 288), to identify data corresponding to the detected ultrasonic wave.

The display 260 (e.g., the display 160) may include a panel 262, a hologram device 264, a projector 266, and/or a control circuitry for controlling them. The panel 262 may, for example, be implemented to be flexible, transparent, or wearable. The panel 262 may be configured as one or more modules along with the touch panel 252. According to an embodiment, the panel 262 may include a pressure sensor (or force sensor) capable of measuring pressure information (e.g., a pressure coordinate and a pressure intensity) on a user's touch. The pressure sensor may be implemented integrally with the touch panel 252, or be implemented as one or more sensors separate from the touch panel 252. According to an embodiment, the panel 262 may include a finger scan sensor capable of detecting fingerprint information (e.g., fingerprint image) on a user's touch. The finger scan sensor may be implemented integrally with the touch panel 252, or be implemented as one or more sensors separate from the touch panel 252. The hologram device 264 may show a three-dimensional image to the air by using the interference of light. The projector 266 may project light onto a screen to display an image. The screen may, for example, be disposed inside or outside the electronic device 201. The interface 270 may, for example, include an HDMI 272, a USB 274, an optical interface 276, or a D-subminiature (D-sub) 278. The interface 270 may be, for example, included in the communication interface 170 shown in FIG. 1A. Additionally or alternatively, the interface 270 may, for example, include a mobile high-definition link (MHL) interface, an SD card/multi-media card (MMC) interface, or an infrared data association (IrDA) standard interface.

The audio module 280 may, for example, convert a sound and an electrical signal interactively. At least some constituent elements of the audio module 280 may, for example, be included in the input output interface 145 shown in FIG. 1A. The audio module 280 may, for example, process sound information that is inputted or outputted through a speaker 282, a receiver 284, an earphone 286, the microphone 288 or the like. The camera module 291 may be, for example, a device able to capture a still image and a video. According to an embodiment, the camera module 291 may include one or more image sensors (e.g., a front sensor or rear sensor), a lens, an ISP, or a flash (e.g., an LED, a xenon lamp or the like). The power management module 295 may, for example, manage power of the electronic device 201. According to an embodiment, the power management module 295 may include a power management integrated circuit (PMIC), a charger IC, or a battery or fuel gauge. The PMIC may employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuitry for wireless charging, for example, a coil loop, a resonance circuitry, a rectifier or the like. The battery gauge may, for example, measure a level of the battery 296, a voltage in charge, an electric current or a temperature. The battery 296 may, for example, include a rechargeable battery and/or a solar battery.

The indicator 297 may display a specific state (for example, a booting state, a message state, a charging state or the like) of the electronic device 201 or a part (e.g., the processor 210) of the electronic device 201. The motor 298 may convert an electrical signal into a mechanical vibration, and may generate a vibration, a haptic effect or the like. The electronic device 201 may, for example, include a mobile TV support device (e.g., a GPU) capable of processing media data according to the standards of digital multimedia broadcasting (DMB), digital video broadcasting (DVB), mediaFlo™ or the like. The constituent elements described in the present document may each consist of one or more components, and a name of the corresponding constituent element may vary according to the kind of the electronic device. In various embodiments, the electronic device (e.g., the electronic device 201) may omit some constituent elements, or further include additional constituent elements, or combine some of the constituent elements and configure the same as one entity to identically perform functions of the corresponding constituent elements before combination.

Figure 3:
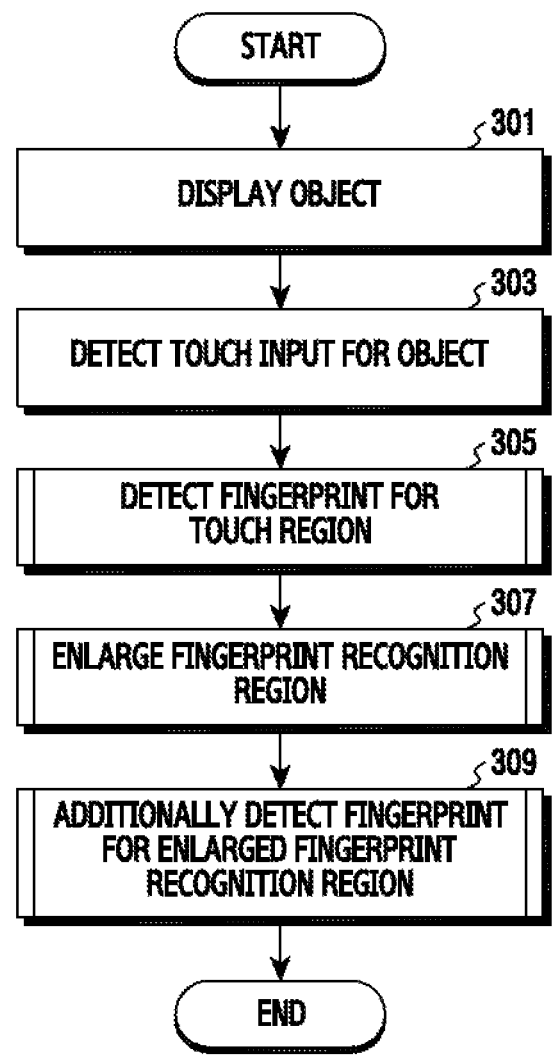
FIG. 3 illustrates a flowchart for setting a fingerprint recognition region in an electronic device according to various embodiments of the present disclosure.
Figure 4A:
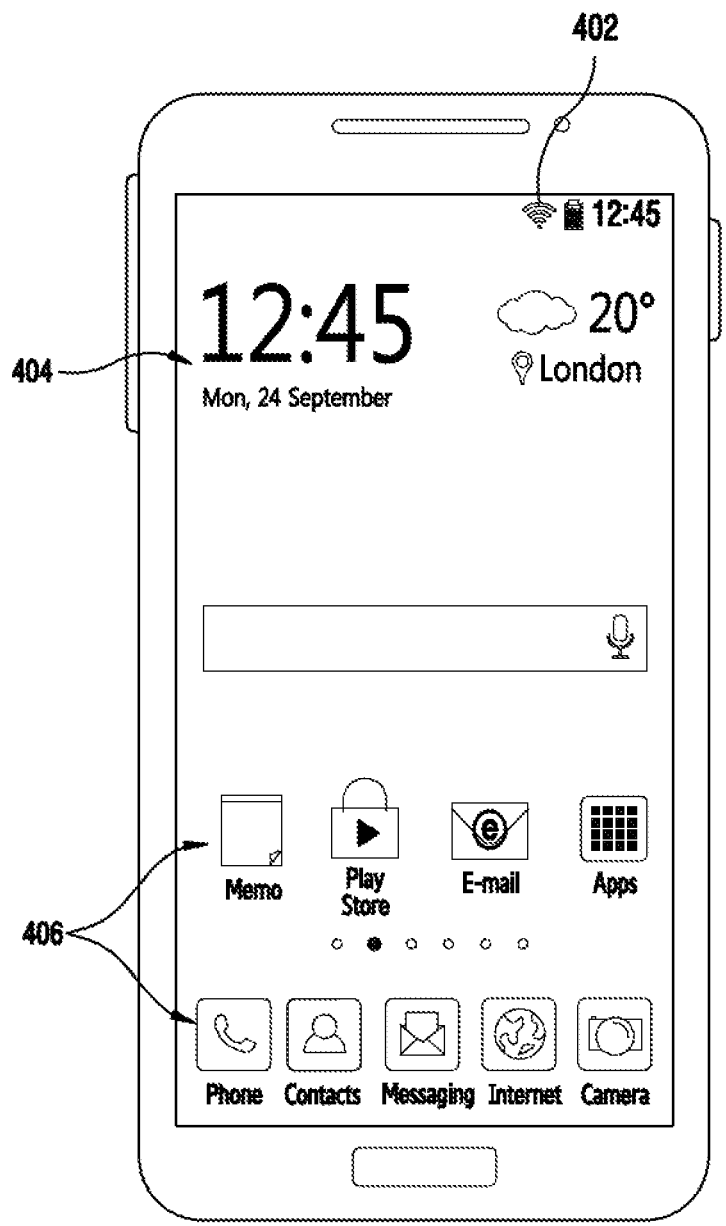
FIGS. 4A, 4B, and 4C illustrate a screen configuration for setting a fingerprint recognition region in an electronic device according to various embodiments of the present disclosure.
Figure 4B:
Figure 4C:
Figure 5A:
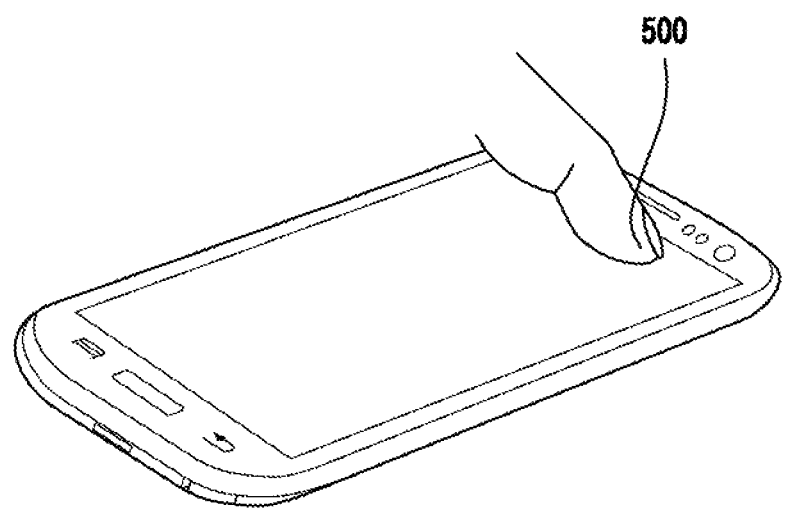
FIGS. 5A and 5B illustrate a user's input form for fingerprint recognition according to various embodiments of the present disclosure.
Figure 5B:
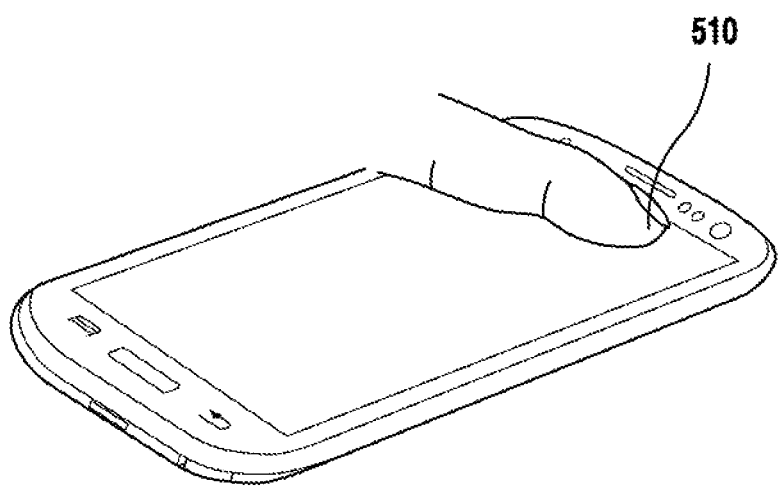

FIG. 3 illustrates a flowchart for setting a fingerprint recognition region in an electronic device according to various embodiments of the present disclosure. FIGS. 4A to 4C illustrate a screen configuration for setting a fingerprint recognition region in the electronic device according to various embodiments of the present disclosure. FIG. 5A and FIG. 5B illustrate a user's input form for fingerprint recognition according to various embodiments of the present disclosure. In the following description, the electronic device may include the electronic device 101 of FIG. 1A or at least a part (e.g., the processor 120) of the electronic device 101.

Referring to FIG. 3, in operation 301, the electronic device may display a plurality of objects at a display. For example, as in FIG. 4A, the processor 120 may control to display, at the display 160, a service screen (e.g., idle screen) which includes state information 402 (e.g., wireless LAN activity information) of the electronic device 101, a widget 404 (e.g., weather information), and an icon 406 of at least one application installed in the electronic device 101.

In operation 303, the electronic device may detect a touch input for at least one object among the plurality of objects displayed at the display. For example, the processor 120 may detect a touch input for the wireless LAN activity information 402 among the plurality of objects displayed at the display 160, through the touch panel 162 overlapped with at least a part of a display panel of the display 160.

In operation 305, the electronic device may detect at least a part of a user fingerprint corresponding to a touch region. For example, the processor 120 may check whether a fingerprint authentication event occurs based on the setting or non-setting of a service corresponding to touch information (e.g., a touch holding time or a pressure intensity) of an object or user authentication of the object. When detecting the occurrence of the fingerprint authentication event, the processor 120 may set, as a fingerprint recognition region, at least a part of a finger scan sensor (e.g., fingerprint panel 164) which is overlapped with the touch region where the touch input for the object has been detected. The processor 120 may control the finger scan sensor such that the at least part having been set as the fingerprint recognition region is activated.

As in FIG. 4B, the processor 120 may detect at least a part 410 of a user fingerprint through a fingerprint recognition region having been set with a criterion of a touch point of an object. In more detail, when selecting an object of a relatively small size like the wireless LAN activity information 402 displayed at the display 160, a user of the electronic device 101 may use at least a part 500 of the finger's last joint as in FIG. 5A. Accordingly, the processor 120 may detect a fingerprint image of a part of the finger's last joint with which the user comes in contact with the display 160 in order to select the wireless LAN activity information 402.

In operation 307, the electronic device may enlarge the fingerprint recognition region for the sake of user authentication. For example, when detecting at least a part of a user fingerprint corresponding to a touch region, the processor 120 may control the finger scan sensor to enlarge a size of the fingerprint recognition region 420 as in FIG. 4C. For instance, the processor 120 may control the finger scan sensor to enlarge the size of the fingerprint recognition region to a size corresponding to a size of the largest reference fingerprint image among at least one reference fingerprint image stored in the memory 120. Additionally or alternatively, the processor 120 may control the display 160 to change a display variable of the fingerprint recognition region such that the fingerprint recognition region is distinguished from a remnant region.

In operation 309, the electronic device may additionally detect a fingerprint (i.e., a fingerprint image) through the enlarged fingerprint recognition region. For example, when the fingerprint recognition region of the finger scan sensor is enlarged 420 as in FIG. 4C, a user of the electronic device 101 may get the majority 510 of the finger's last joint to be in contact with the display 160. Accordingly, by using the finger scan sensor, the processor 120 may detect a fingerprint image of the finger with which the user gets in contact with the fingerprint recognition region 420 of the display 160. By comparing fingerprint information detected through the fingerprint recognition region 420 and at least one reference fingerprint image stored in the memory 130, the processor 120 may perform user authentication. When detecting a reference fingerprint image matched with the fingerprint information detected through the fingerprint recognition region 420, the processor 120 may determine that it has succeeded in user authentication. In this case, the processor 120 may perform an operation or function mapped to the user authentication of the object in which the touch input has been detected. In more detail, when succeeding in the user authentication of the wireless LAN activity information 402, the processor 120 may attempt wireless LAN connection by a preset access point (AP). According to an embodiment, when failing the user authentication, the processor 120 may control the display 160 to output a message for guiding user re-authentication. According to an embodiment, when failing the user authentication, the processor 120 may perform an operation or function corresponding to the touch input for the object.

According to various embodiments of the present disclosure, the electronic device may perform user authentication by using at least a part of a user fingerprint corresponding to a touch region of an object. When succeeding in the user authentication utilizing the at least part of the user fingerprint corresponding to the touch region, the electronic device may enlarge a fingerprint recognition region in order to enhance a reliability of the user authentication.

Figure 6A:
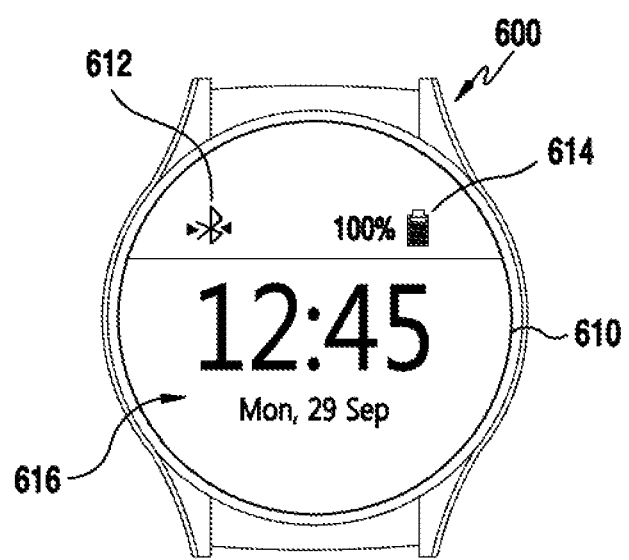
FIGS. 6A, 6B, and 6C illustrate a screen configuration for setting a fingerprint recognition region in a wearable device according to various embodiments of the present disclosure.
Figure 6B:
Figure 6C:
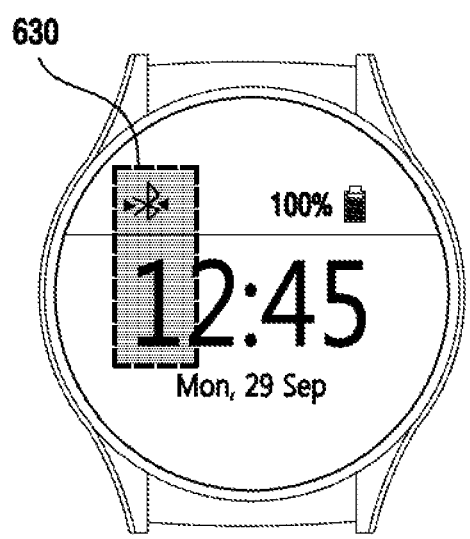

FIGS. 6A to 6C illustrate a screen configuration for setting a fingerprint recognition region in a wearable device according to various embodiments of the present disclosure. In the following description, the wearable device 600 may include the electronic device 101 of FIG. 1A or at least a part (e.g., the processor 120) of the electronic device 101.

Referring to FIG. 6A, the wearable device 600 may display a service screen at a display 610. For example, when operating in an idle mode, as in FIG. 6A, the wearable device 600 may display, at the display 610, a service screen (e.g., idle screen) that includes Bluetooth activity information 612, battery level information 614 and time information 616.

Referring to FIG. 6B, the wearable device 600 may detect a fingerprint corresponding to a touch input for a specific object among a plurality of objects (e.g., 612, 614, and 616) displayed at the display 610. For example, when detecting a touch input for Bluetooth activity information 612, the wearable device 600 may check whether a fingerprint authentication event occurs, based on touch information (e.g., a touch holding time or pressure intensity) of the Bluetooth activity information 612. When detecting the occurrence of the fingerprint authentication event, the wearable device 600 may set, as a fingerprint recognition region, at least a part of a finger scan sensor corresponding to the touch input for the Bluetooth activity information 612. As in FIG. 6B, the wearable device 600 may detect at least a part 620 of a user fingerprint through a fingerprint recognition region. For instance, the wearable device 600 may activate the fingerprint recognition region of the finger scan sensor, and keep a remnant region in an inactive state.

Referring to FIG. 6C, the wearable device 600 may enlarge a fingerprint recognition region for the sake of user authentication. For example, as in FIG. 6C, when detecting a fingerprint image through a fingerprint recognition region corresponding to a touch input for the Bluetooth activity information 612, the wearable device 600 may enlarge a size of the fingerprint recognition region 630. Additionally or alternatively, the wearable device 600 may display the fingerprint recognition region through the display 610.

According to an embodiment, the wearable device 600 may detect a user's fingerprint image through the fingerprint recognition region 630 having been set as in FIG. 6C. When succeeding in user authentication through the fingerprint image detected through the enlarged fingerprint recognition region 630, the wearable device 600 may perform an operation or function mapped to the user authentication of the Bluetooth activity information 612. For example, when succeeding in the user authentication through the fingerprint image detected through the fingerprint recognition region 630, the wearable device 600 may attempt Bluetooth connection with a preset external device. For example, when succeeding in the user authentication through the fingerprint image detected through the fingerprint recognition region 630, the wearable device 600 may attempt wireless LAN connection (e.g., Wi-Fi connection) with the external device Bluetooth-connected.

Figure 7:
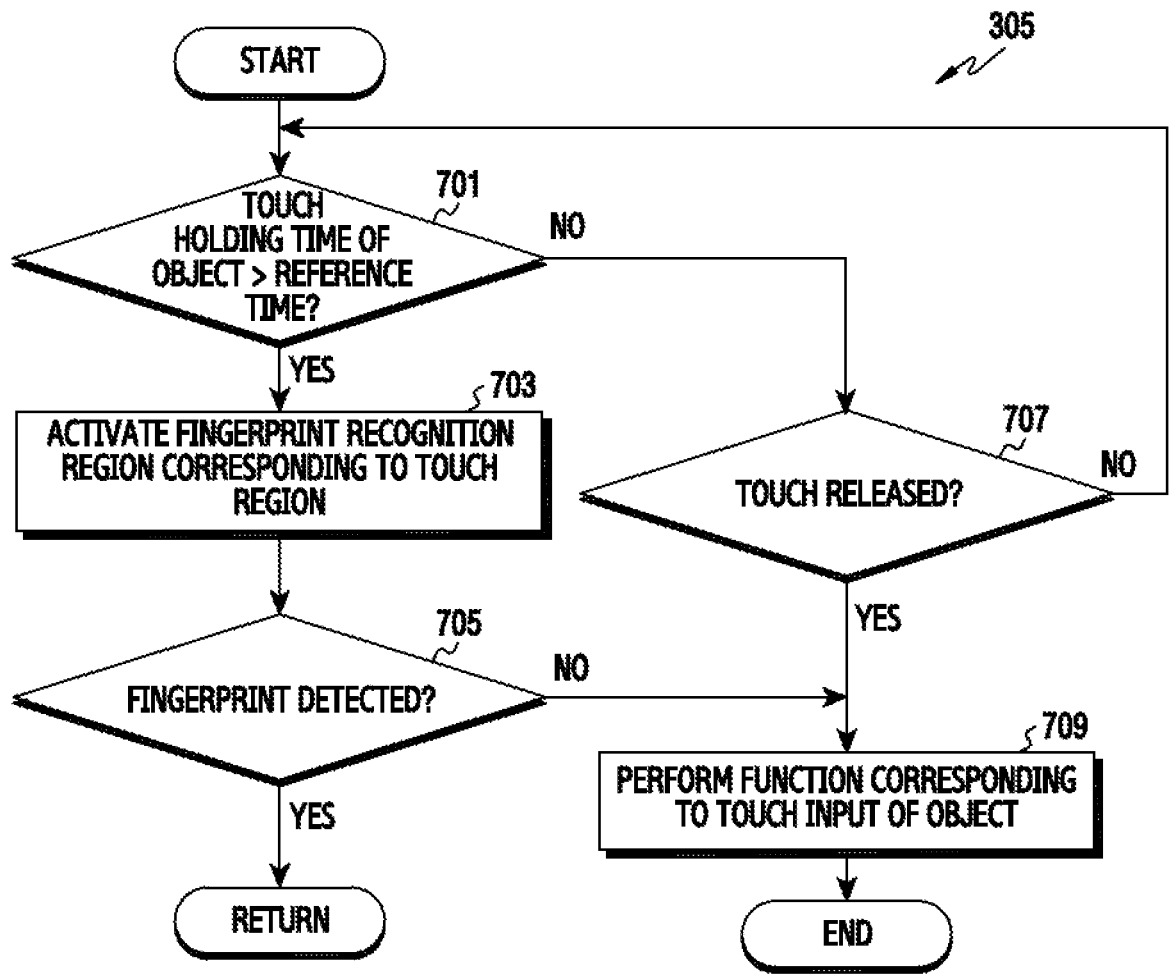
FIG. 7 illustrates a flowchart for selectively setting a fingerprint recognition region based on a touch holding time of an object in an electronic device according to various embodiments of the present disclosure.

FIG. 7 illustrates a flowchart for selectively setting a fingerprint recognition region based on a touch holding time of an object in an electronic device according to various embodiments of the present disclosure. In the following description, an operation for detecting a fingerprint of a touch region in operation 305 of FIG. 3 is described. In the following description, the electronic device may include the electronic device 101 of FIG. 1A or at least a part (e.g., the processor 120) of the electronic device 101.

Referring to FIG. 7, in operation 701, when detecting a touch input for at least one object displayed at a display (e.g., operation 303 of FIG. 3), the electronic device may check whether a touch holding time of an object exceeds a reference time. For example, to perform fingerprint recognition through a touch input for an object, a user of the electronic device 101 may maintain the touch input for the object during a constant time relatively compared with a touch input for selecting the object. Accordingly, when the touch holding time of the object exceeds the reference time, the processor 120 may determine to perform fingerprint recognition for an object. For instance, the touch holding time of the object may include time information for which a touch of the object is held from a time point at which the touch input for the object has been detected.

In operation 707, when the touch holding time of the object is equal to or is less than the reference time, the electronic device may check whether the touch input for the object is released.

When the touch input for the object is maintained, in operation 701, the electronic device may again check whether the touch holding time of the object exceeds the reference time. For example, the processor 120 may check continuously or periodically whether the touch holding time of the object exceeds the reference time.

In operation 703, when the touch holding time of the object exceeds the reference time, the electronic device may activate a fingerprint recognition region corresponding to a touch region. For example, when the touch holding time of the object exceeds the reference time, the processor 120 may determine that a fingerprint authentication event has occurred. Accordingly, the processor 120 may control a finger scan sensor such that at least a partial region (i.e., the fingerprint recognition region) of the finger scan sensor which is overlapped with the touch region where the touch input for the object has been detected is activated.

In operation 705, the electronic device may check whether a user's fingerprint image is detected through the fingerprint recognition region. For example, the processor 120 may check whether the user's fingerprint image is detected, by radiating light through a plurality of light emitting modules (e.g., pixels) included in the activated at least partial region of the finger scan sensor and collecting light reflected from a part of the user' human body through a light receiving module.

In operation 709, in a state in which the touch holding time of the object is less than the reference time, when the touch input for the object is released, or the fingerprint image is not detected through the fingerprint recognition region, the electronic device may perform a function corresponding to the touch input for the object. For example, the processor 120 may execute an application corresponding to the object, based on the touch input for the object. The processor 120 may control the display 160 to display general content corresponding to the execution of the corresponding application.

Figure 8:
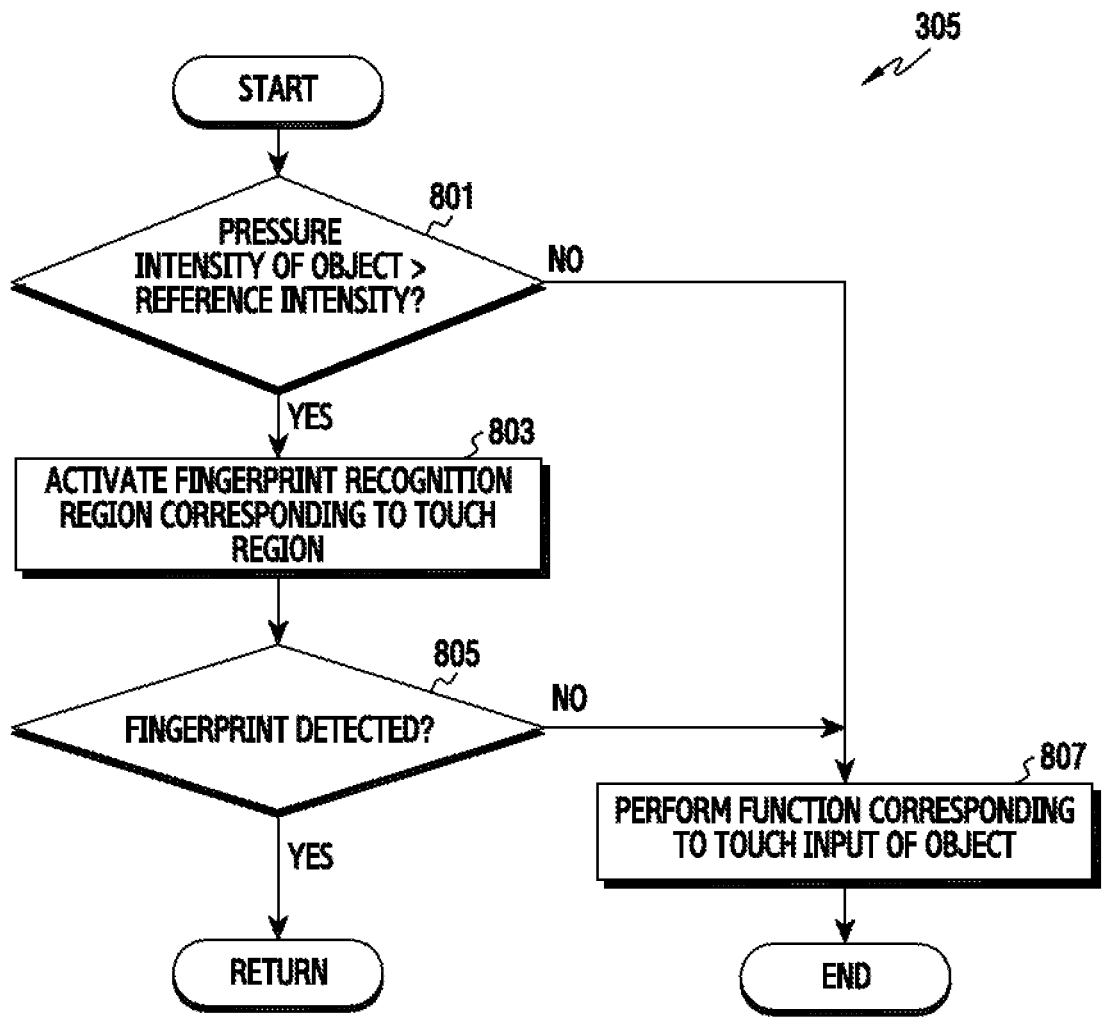
FIG. 8 illustrates a flowchart for selectively setting a fingerprint recognition region based on an intensity of a selection input for an object in an electronic device according to various embodiments of the present disclosure.

FIG. 8 illustrates a flowchart for selectively setting a fingerprint recognition region based on an intensity of a selection input for an object in an electronic device according to various embodiments of the present disclosure. In the following description, an operation for detecting a fingerprint of a touch region in operation 305 of FIG. 3 is described. In the following description, the electronic device may include the electronic device 101 of FIG. 1A or at least a part (e.g., the processor 120) of the electronic device 101.

Referring to FIG. 8, in operation 801, when detecting a touch input for at least one object displayed at a display (e.g., operation 303 of FIG. 3), the electronic device may check whether a pressure intensity corresponding to the touch input for the object exceeds a reference intensity. For example, the processor 120 may detect an intensity of a pressure, which is generated by the touch input for the object, through a pressure panel of the display 160. To determine the occurrence or non-occurrence of a fingerprint recognition event, the processor 120 may check whether the intensity of the pressure generated by the touch input for the object exceeds a predefined reference intensity. For instance, when the intensity of the pressure generated by the touch input for the object is equal to or is less than the reference intensity, the processor 120 may periodically or continuously compare the intensity of the pressure generated by the touch input for the object and the reference intensity, until the touch input for the object is released.

In operation 803, when the pressure intensity of the object exceeds the reference intensity, the electronic device may activate a fingerprint recognition region corresponding to a touch region. For example, when the pressure intensity of the object exceeds the reference intensity, the processor 120 may determine that a fingerprint authentication event has occurred. When detecting the occurrence of the fingerprint authentication event, the processor 120 may set, as the fingerprint recognition region, at least a partial region of the finger scan sensor overlapped with the touch region where the touch input for the object has been detected. The finger scan sensor (e.g., fingerprint panel 164) may activate the at least partial region that the processor 120 has set as the fingerprint recognition region.

In operation 805, the electronic device may check whether a fingerprint image is detected through the fingerprint recognition region which has been set based on the pressure intensity of the object. For example, the processor 120 may check whether a user's fingerprint image is detected, by recognizing a ridge pattern generated by a finger having come in contact with the fingerprint recognition region of the finger scan sensor. For instance, the processor 120 may check whether at least a part of a user fingerprint corresponding to a touch input for an object is detected.

In operation 807, when the pressure intensity of the object is less than the reference intensity, or the fingerprint image is not detected through the fingerprint recognition region, the electronic device may perform a function corresponding to the touch input for the object.

An electronic device according to various embodiments of the present disclosure may determine the occurrence or non-occurrence of a fingerprint recognition event, based on a touch area of an object. For example, to perform fingerprint recognition through a touch input for the object, a user of the electronic device 101 maintains the touch input for the object during a constant time, so the touch area of the object may increase. Accordingly, when the touch area of the object exceeds a reference area, the processor 120 may determine that the fingerprint recognition event for performing the fingerprint recognition corresponding to the object has occurred.

Figure 9:
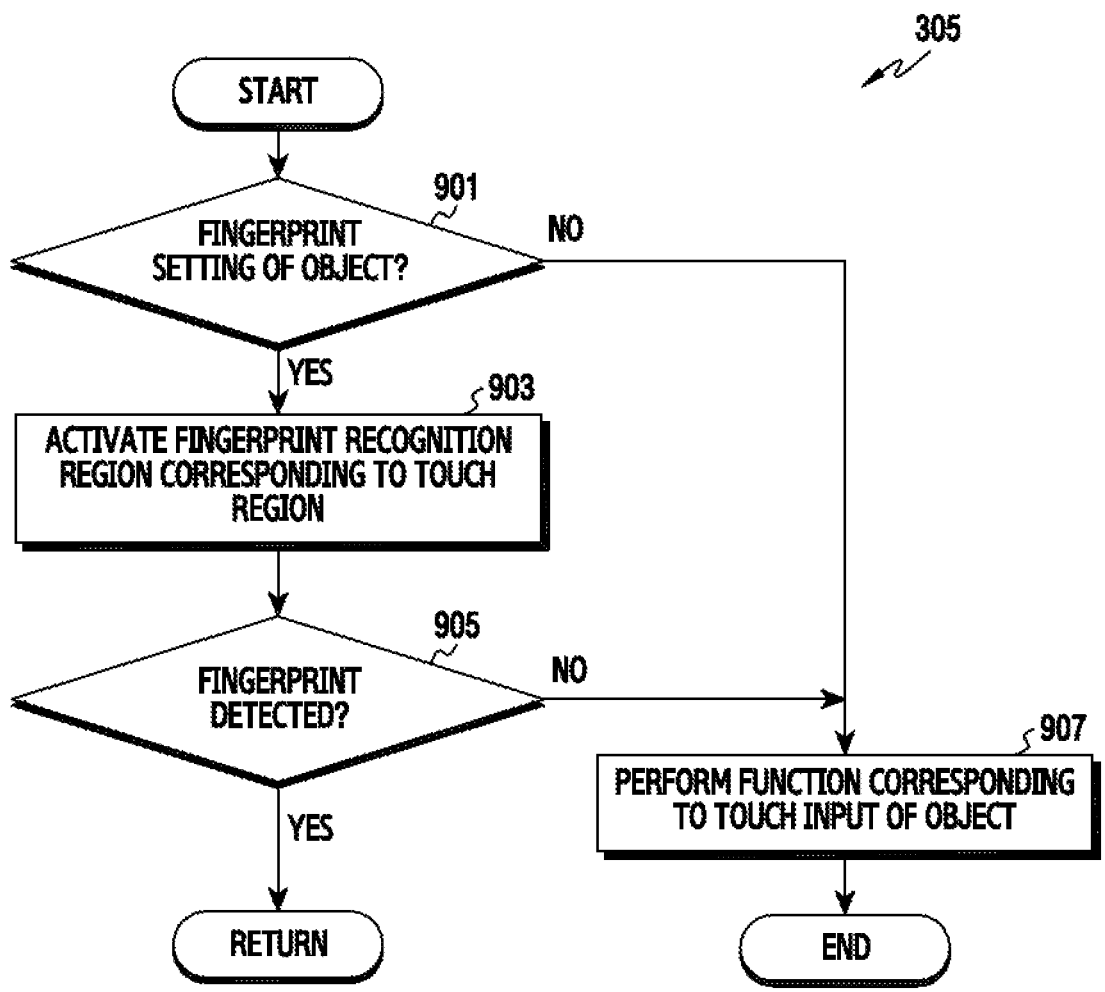
FIG. 9 illustrates a flowchart for selectively setting a fingerprint recognition region based on fingerprint setting or non-setting of an object in an electronic device according to various embodiments of the present disclosure.

FIG. 9 illustrates a flowchart for selectively setting a fingerprint recognition region based on fingerprint setting or non-setting of an object in an electronic device according to various embodiments of the present disclosure. In the following description, an operation for detecting a fingerprint of a touch region in operation 305 of FIG. 3 is described. In the following description, the electronic device may include the electronic device 101 of FIG. 1A or at least a part (e.g., the processor 120) of the electronic device 101.

Referring to FIG. 9, in operation 901, when detecting a touch input for at least one object displayed at a display (e.g., operation 303 of FIG. 3), the electronic device may check whether a function according to user authentication has been set to an object in which a touch input has been detected. For example, the processor 120 may check whether a function to be carried out through a reference fingerprint image for user authentication, which is mapped to the object in which the touch input has been detected in a mapping table stored in the memory 130, and the user authentication.

In operation 903, when the function according to the user authentication has been set to the object in which the touch input has been sensed, the electronic device may activate a fingerprint recognition region corresponding to a touch region. For example, when the function according to the user authentication has been set to the object in which the touch input has been sensed, the processor 120 may determine that a fingerprint authentication event for the object in which the touch input has been sensed has occurred. Accordingly, the processor 120 may set, as the fingerprint recognition region, at least a partial region of a finger scan sensor overlapped with the touch region where the touch input for the object has been detected. The processor 120 may control the finger scan sensor such that the at least partial region of the finger scan sensor corresponding to the fingerprint recognition region is activated. That is, the finger scan sensor may maintain a remnant region other than the fingerprint recognition region, in an inactive state.

In operation 905, the electronic device may check whether a user's fingerprint image is detected through the fingerprint recognition region corresponding to the touch region of the object. For example, when selecting an object of a relatively small size among a plurality of objects displayed at the display 160, a user of the electronic device 101 may select the corresponding object by using at least a part of the finger's last joint as in FIG. 5A. Accordingly, the processor 120 may check whether a fingerprint image of the at least part of the finger's last joint having come in contact with the fingerprint recognition region corresponding to the touch region of the object is detected.

In operation 907, when the function according to the user authentication has not been set to the object in which the touch input has been sensed, or the fingerprint image is not detected through the fingerprint recognition region, the electronic device may perform a function corresponding to the touch input for the object. For example, when detecting a touch input for an icon of a phone application among a plurality of objects displayed at the display 160 as in FIG. 4A, the processor 120 may execute the phone application. The processor 120 may control the display 160 to display general information (i.e., virtual key button) corresponding to the execution of the phone application.

Figure 10:
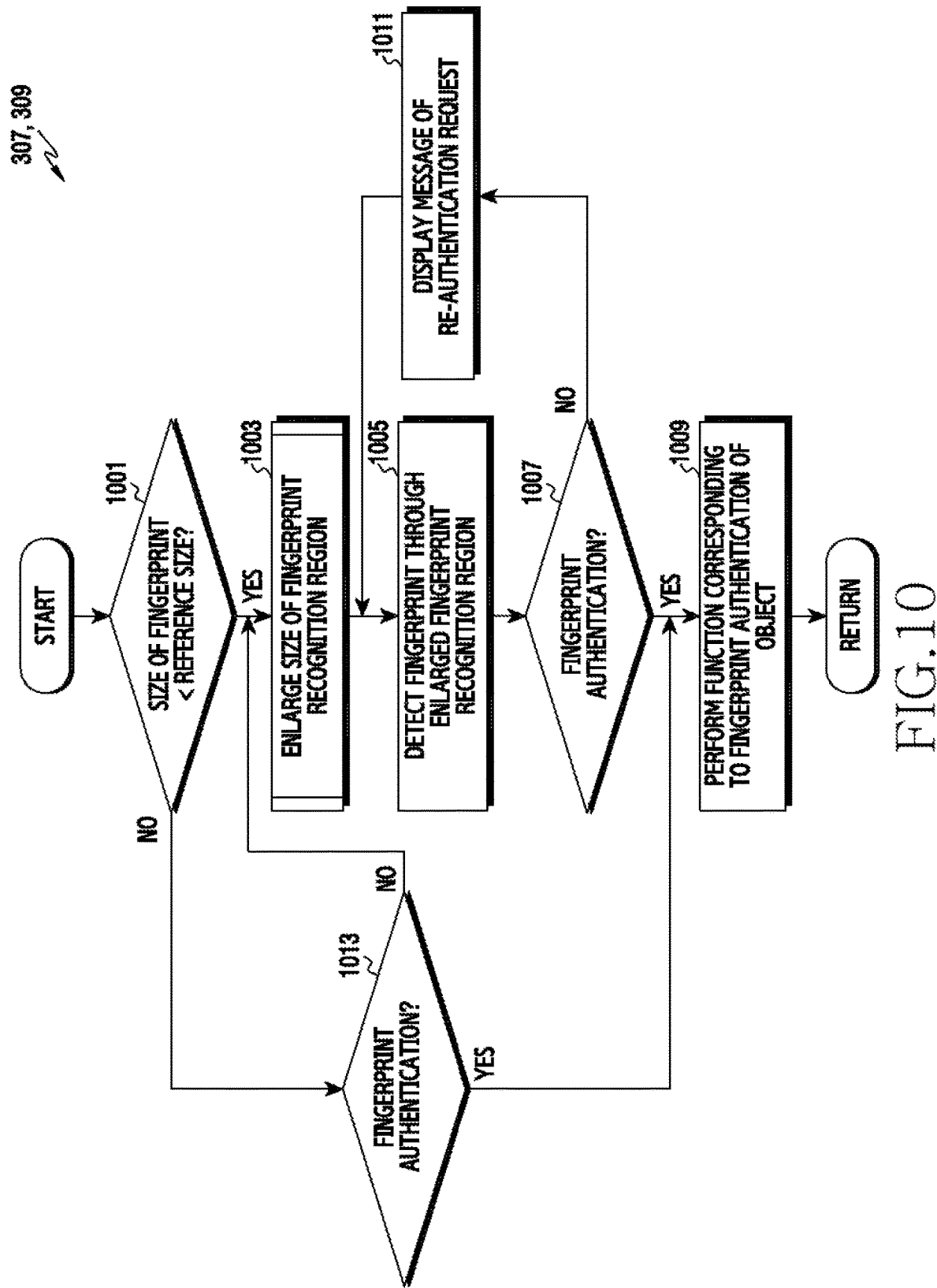
FIG. 10 illustrates a flowchart for performing fingerprint recognition by using a fingerprint recognition region in an electronic device according to various embodiments of the present disclosure.
Figure 11A:
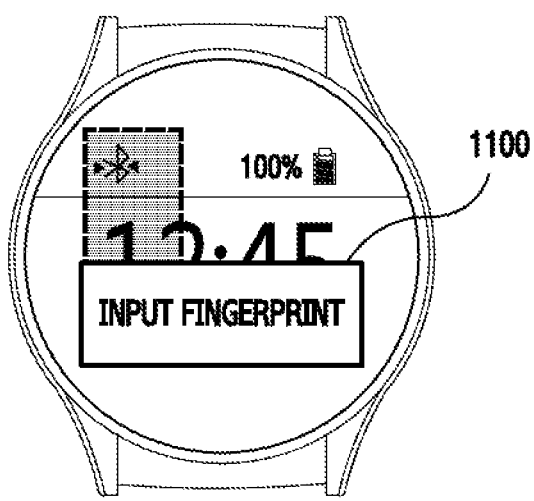
FIGS. 11A, 11B, 11C, and 11D illustrate a screen configuration of notification information for fingerprint recognition according to various embodiments of the present disclosure.
Figure 11B:
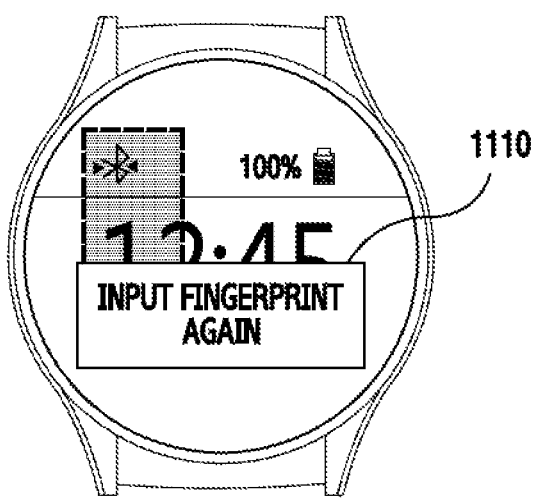
Figure 11C:
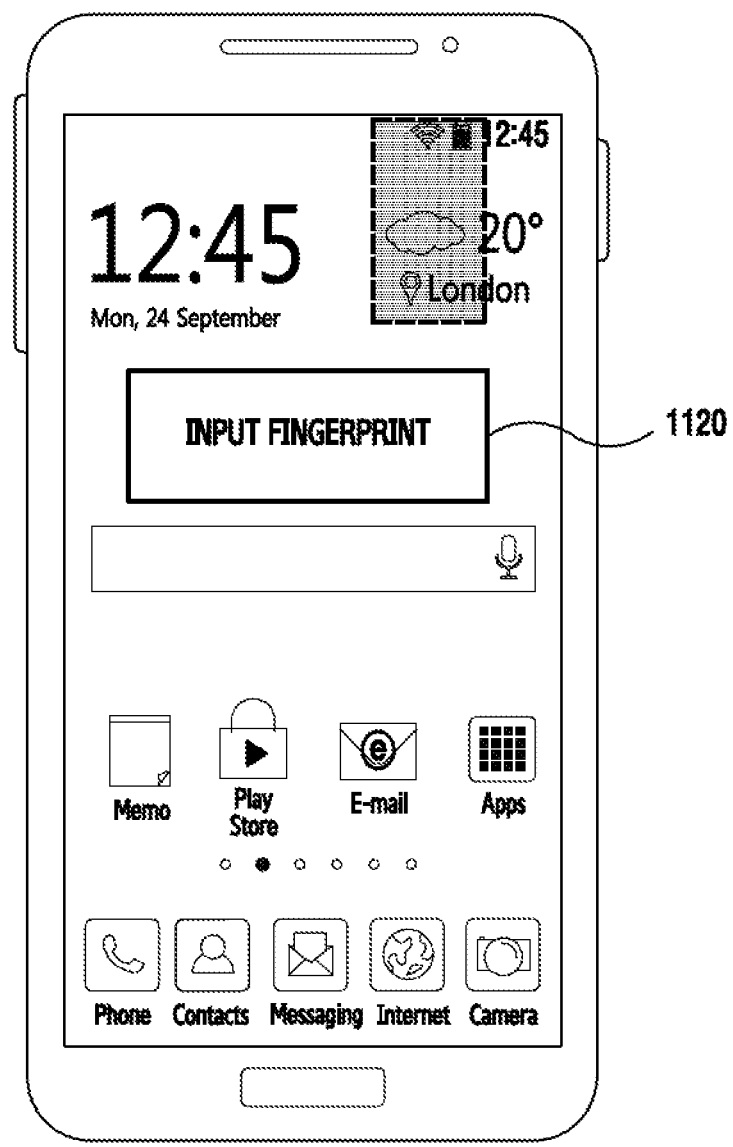
Figure 11D:
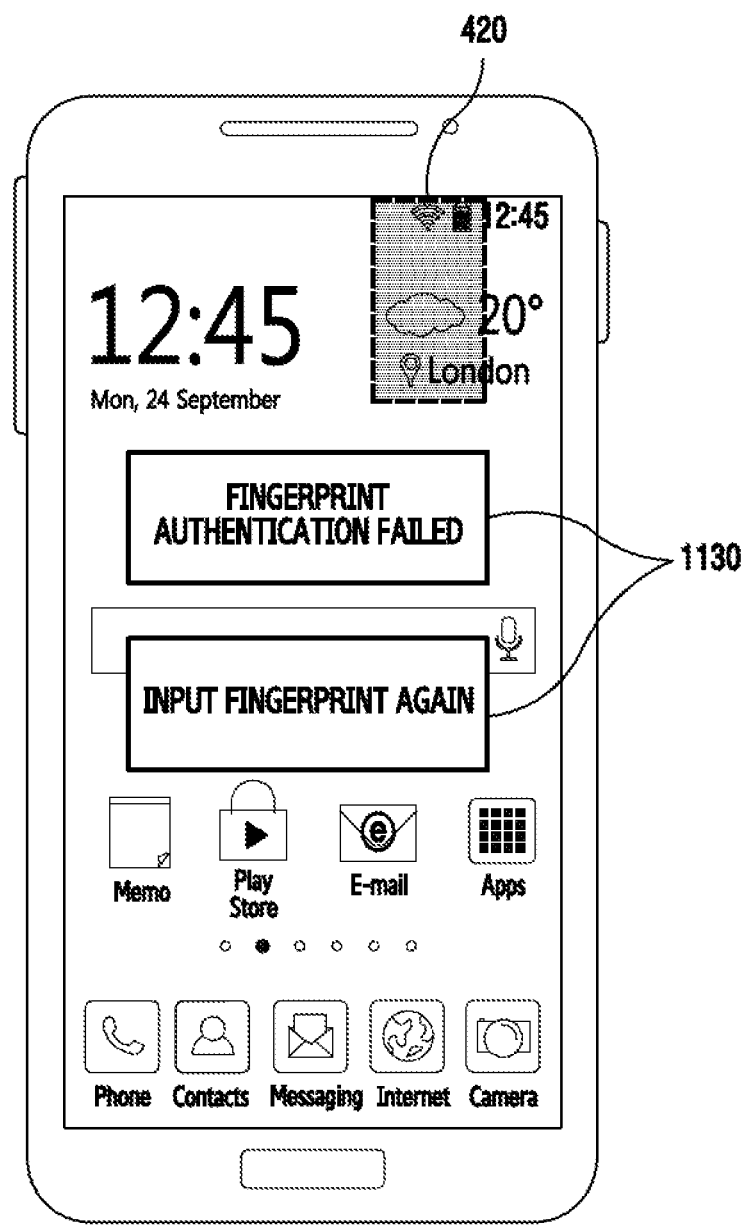

FIG. 10 illustrates a flowchart for performing fingerprint recognition by using a fingerprint recognition region in an electronic device according to various embodiments of the present disclosure. FIGS. 11A to 11D illustrate a screen configuration of notification information for fingerprint recognition according to various embodiments of the present disclosure. In the following description, an operation for detecting a fingerprint through an enlarged fingerprint recognition region in operation 307 to operation 309 of FIG. 3 is described. In the following description, the electronic device may include the electronic device 101 of FIG. 1A or at least a part (e.g., the processor 120) of the electronic device 101.

Referring to FIG. 10, in operation 1001, when detecting at least a part of a user fingerprint through a fingerprint recognition region corresponding to a touch region of an object (e.g., operation 305 of FIG. 3), the electronic device may compare a size of a fingerprint image detected through the fingerprint recognition region and a reference size. For example, a user of the electronic device 101 may touch the corresponding object in various forms, based on sizes of a plurality of objects displayed at the display 160. In more detail, when selecting an object of a relatively small size like state information displayed at an upper end of the display 160, the user of the electronic device 101 may touch the corresponding object by using at least a part 500 of the finger's last joint as in FIG. 5A. On the other hand, when selecting an object of a relatively large size like an icon of an application, the user of the electronic device 101 may touch the corresponding object by using the majority 510 of the finger's last joint as in FIG. 5B. For instance, when a size of at least a part of a user fingerprint is smaller than a reference size, the processor 120 may determine that a reliability of user authentication utilizing a corresponding fingerprint image is deteriorated. For instance, when the size of the at least part of the user fingerprint is larger than the reference size, the processor 120 may determine that the user authentication utilizing the corresponding fingerprint image is reliable.

In operation 1003, when the size of the fingerprint image detected through the fingerprint recognition region is smaller than or is equal to the reference size, the electronic device may enlarge the size of the fingerprint recognition region. For example, when the size of the fingerprint image detected in operation 705 of FIG. 7, operation 805 of FIG. 8, or operation 905 of FIG. 9 is smaller than or is equal to the reference size, the processor 120 may determine that the reliability of the user authentication utilizing the corresponding fingerprint image is deteriorated. Accordingly, to enhance the reliability of user authentication, the processor 120 may control the finger scan sensor (i.e., the fingerprint panel 164) to enlarge the size of the fingerprint recognition region. For instance, the processor 120 may determine a size for enlarging the fingerprint recognition region based on a size of at least one reference fingerprint image stored in the memory 120.

In operation 1005, the electronic device may detect a user's fingerprint image through the enlarged fingerprint recognition region. For example, when enlarging the fingerprint recognition region, the processor 120 may control the display 160 to display a message 1100 or 1120 (e.g., "Input a fingerprint") of requesting a fingerprint input as in FIG. 11A or FIG. 11C so that a user may recognize a fingerprint recognition operation. Additionally or alternatively, the processor 120 may change a display variable of a display panel corresponding to the fingerprint recognition region differently from a remnant region so that the user may recognize the fingerprint recognition region. When a user's contact (i.e., touch) for the enlarged fingerprint recognition region is sensed, the processor 120 may detect a user's fingerprint image through a finger scan sensor.

In operation 1007, the electronic device may perform user authentication by using the fingerprint image detected through the enlarged fingerprint recognition region. For example, the processor 120 may compare at least one reference fingerprint image stored in the memory 130 and the fingerprint image detected through the enlarged fingerprint recognition region. When detecting a reference fingerprint image matched with the fingerprint image detected through the enlarged fingerprint recognition region, the processor 120 may determine that it has succeeded in the user authentication. When not detecting the reference fingerprint image matched with the fingerprint image detected through the enlarged fingerprint recognition region, the processor 120 may determine that it has failed in the user authentication.

In operation 1011, when failing in user authentication utilizing the fingerprint image detected through the enlarged fingerprint recognition region, the electronic device may output information of requesting re-authentication. For example, as in FIG. 11B or FIG. 11D, the processor 120 may control the display 160 to display a message 1110 or 1130 (e.g., "Input a fingerprint again") of requesting the user's fingerprint re-input. For instance, when displaying the message 1110 or 1130 of requesting the user's fingerprint re-input, and not detecting an additional fingerprint input until a reference time lapses, the processor 120 may determine that it has failed in detecting the fingerprint image for the user authentication. For instance, the processor 120 may selectively display the message 1110 or 1130 of requesting the user's fingerprint re-input based on a re-authentication request count. In more detail, when the re-authentication request count exceeds a reference count, the processor 120 may determine that the user authentication is impossible, and terminate a re-authentication request.

In operation 1009, when having succeeded in the user authentication utilizing the fingerprint image detected through the enlarged fingerprint recognition region, the electronic device may perform an operation or function corresponding to fingerprint authentication of an object. For example, when having succeeded in fingerprint authentication of an icon of a phone application displayed at the display 160 as in FIG. 4A, the processor 120 may perform a call connection to a predefined phone number by executing the phone application. For example, when having succeeded in the fingerprint authentication of the icon of the phone application displayed at the display 160 as in FIG. 4A, the processor 120 may control the display 160 to display private information corresponding to the phone application by executing the phone application.

When the size of the fingerprint image detected through the fingerprint recognition region is larger than the reference size, in operation 1013, the electronic device may perform user authentication by using the fingerprint image detected through the fingerprint recognition region. For example, when the size of the fingerprint image detected in operation 705 of FIG. 7, operation 805 of FIG. 8, or operation 905 of FIG. 9 is larger than the reference size, the processor 120 may determine that the user authentication utilizing the corresponding fingerprint image is reliable. Accordingly, the processor 120 may check whether a reference fingerprint image corresponding to the fingerprint image detected through the fingerprint recognition region exists in the memory 103. When detecting a reference fingerprint image matched with the fingerprint image detected through the fingerprint recognition region, the processor 120 may determine that it has succeeded in the user authentication. When not detecting the reference fingerprint image matched with the fingerprint image detected through the fingerprint recognition region, the processor 120 may determine that it has failed in the user authentication.

When having failed in the user authentication utilizing the fingerprint image detected through the fingerprint recognition region, in operation 1003, the electronic device may enlarge the size of the fingerprint recognition region. For example, the processor 120 may determine the enlargement size of the fingerprint recognition region, based on the size of the reference fingerprint image stored in the memory 130. The processor 120 may control the finger scan sensor to enlarge the fingerprint recognition region to a size corresponding to the enlargement size of the fingerprint recognition region. For instance, the processor 120 may determine the enlargement size of the fingerprint recognition region to correspond to the longest horizontal distance and longest vertical distance detected from at least one reference fingerprint image stored in the memory 130.

When having succeeded in the user authentication utilizing the fingerprint image detected through the fingerprint recognition region, in operation 1009, the electronic device may perform the operation or function corresponding to the fingerprint authentication of the object.

Figure 12:
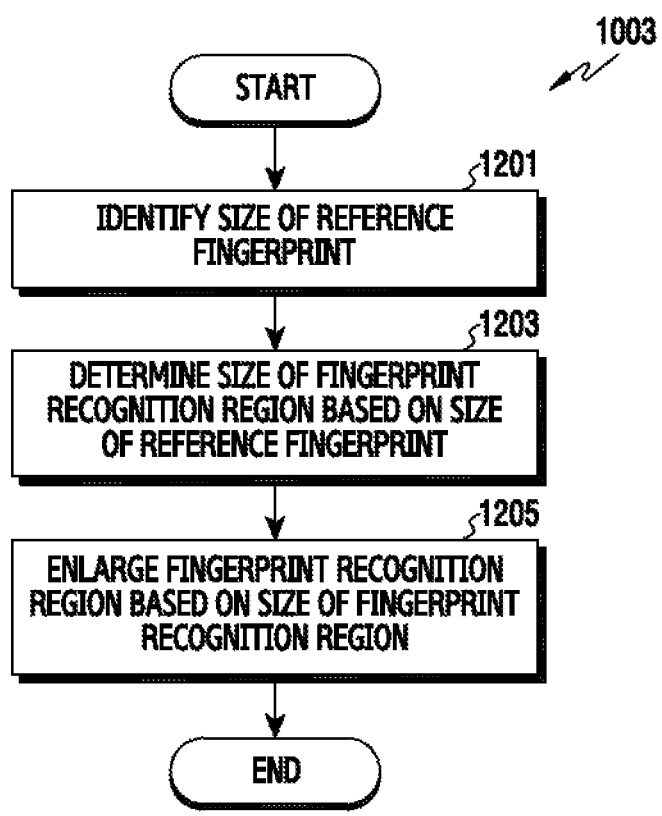
FIG. 12 illustrates a flowchart for setting a size of a fingerprint recognition region in an electronic device according to various embodiments of the present disclosure.

FIG. 12 illustrates a flowchart for setting a size of a fingerprint recognition region in an electronic device according to various embodiments of the present disclosure. In the following description, an operation for enlarging the size of the fingerprint recognition region in operation 1003 of FIG. 10 is described. In the following description, the electronic device may include the electronic device 101 of FIG. 1A or at least a part (e.g., the processor 120) of the electronic device 101.

Referring to FIG. 12, in operation 1201, when determining to additionally authenticate a user's fingerprint (e.g., operation 1001 of FIG. 10), the electronic device may identify a size of at least one reference fingerprint image for fingerprint authentication. For example, the processor 120 may store, in the memory 130, at least one reference fingerprint image that becomes a reference for authenticating a user by using a fingerprint image. When enlarging a fingerprint recognition region so as to additionally authenticate a user's fingerprint, the processor 120 may identify a size of each reference fingerprint image previously stored in the memory 130. For instance, the size of the reference fingerprint image may be the shortest length (e.g., horizontal length) and the longest length (e.g., vertical length) in the fingerprint image.

In operation 1203, the electronic device may determine a size for enlarging the fingerprint recognition region, based on the size of the reference fingerprint image. For example, the processor 120 may determine the size for enlarging the fingerprint recognition region to include a size of the largest reference fingerprint image among at least one reference fingerprint image stored in the memory 130.

In operation 1205, the electronic device may enlarge the fingerprint recognition region to correspond to the size for enlarging the fingerprint recognition region. For example, the processor 120 may control a finger scan sensor to enlarge a region that is activated in the finger scan sensor to correspond to the size for enlarging the fingerprint recognition region. Additionally or alternatively, the display 160 may change a display variable such that at least a partial region of a display panel corresponding to the fingerprint recognition region is distinguished from a remnant region.

FIGS. 13A to 13E illustrate a screen configuration for providing a service corresponding to fingerprint authentication of an object according to various embodiments of the present disclosure. In the following description, the electronic device 1300 may include the electronic device 101 of FIG. 1A or at least a part (e.g., the processor 120) of the electronic device 101.

Figure 13A:
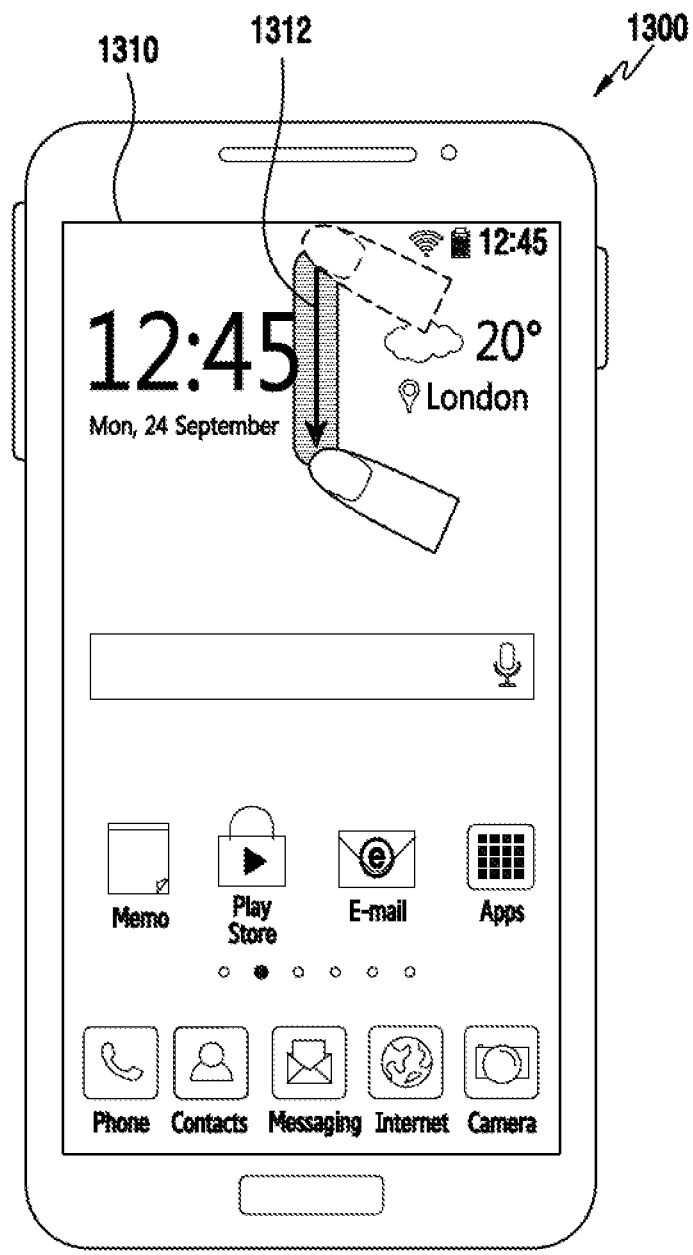
FIGS. 13A, 13B, 13C, 13D, and 13E illustrate a screen configuration for providing a service corresponding to fingerprint authentication of an object according to various embodiments of the present disclosure.

Referring to FIG. 13A, the electronic device 1300 may display a service screen at a display 1310. For example, when operating in an idle mode, as in FIG. 13A, the electronic device 1300 may display, at the display 1310, a service screen including state information (e.g., wireless LAN activity information, a battery level, and time information) of the electronic device 1300, a widget, and an icon of at least one application.

Figure 13B:
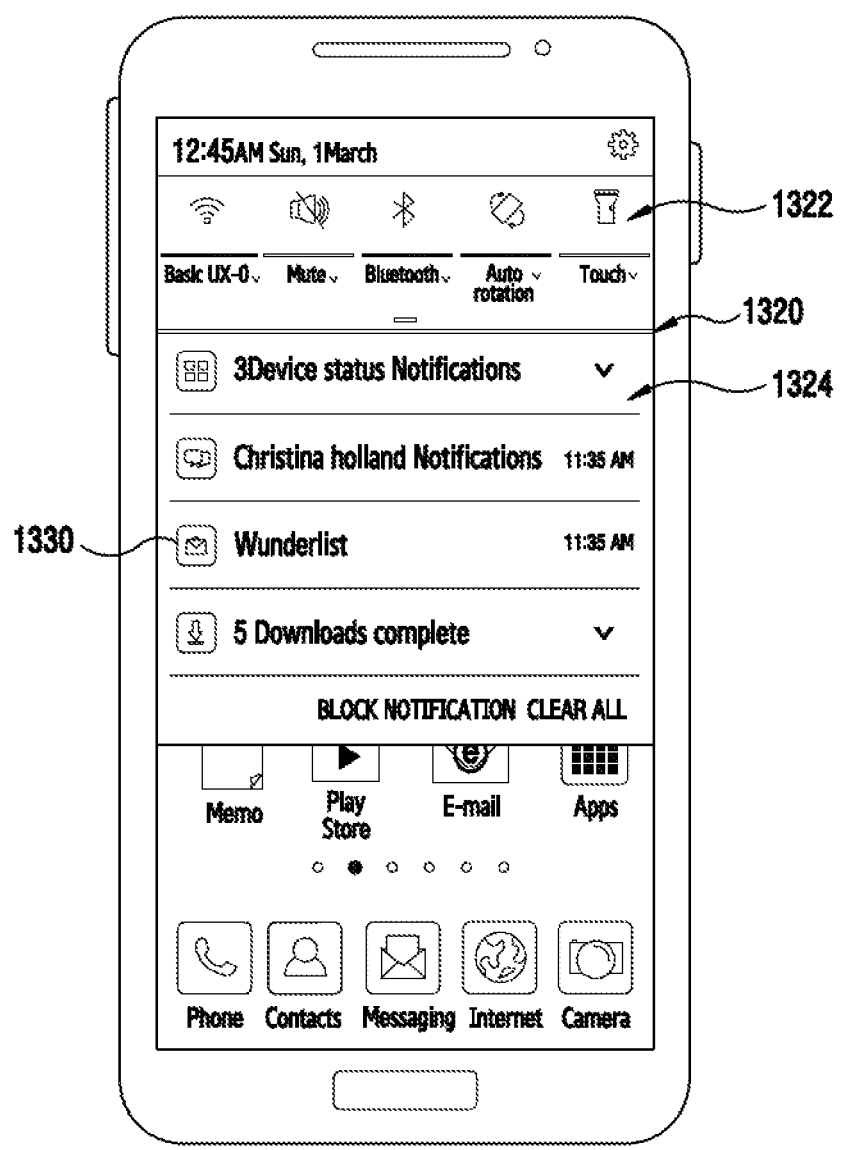

Referring to FIG. 13B, when detecting a drag input 1312 for an upper end of the display 1310, as in FIG. 13B, the electronic device 1300 may display a quick panel 1320 in at least a part of the display 1310. For example, the electronic device 1300 may display the quick panel 1320 by using an additional display layer disposed at an upper end of a display layer displaying a service screen. For instance, the quick panel 1320 may include at least one icon 1322 for control menu setting, and at least one notification information 1324.

According to an embodiment, the electronic device 1300 may detect a fingerprint image corresponding to a touch input for a specific object among a plurality of objects 1322 and 1324 included in the quick panel 1320. For example, the electronic device 1300 may detect a touch input for e-mail reception information 1330 among the notification information 1324 included in the quick panel 1320. The electronic device 1300 may check whether a fingerprint authentication event occurs based on setting or non-setting of a function corresponding to touch information (e.g., a touch holding time or a pressure intensity) on the e-mail reception information 1330 or user authentication. When detecting the occurrence of the fingerprint authentication event, the electronic device 1300 may set, as a fingerprint recognition region, at least a part of a finger scan sensor corresponding to a touch region of the e-mail reception information 1330 and activate the same.

Figure 13C:
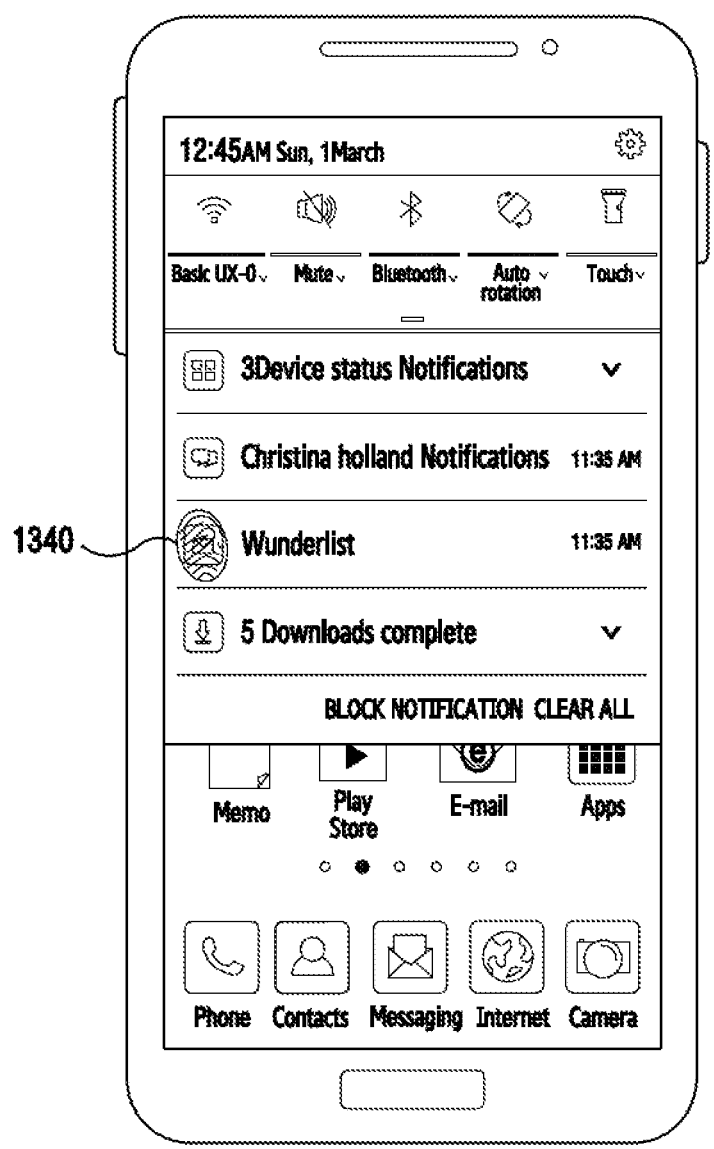

Referring to FIG. 13C, the electronic device 1300 may detect a fingerprint image 1340 through the fingerprint recognition region. For instance, the electronic device 1300 may detect a fingerprint image corresponding to at least a part of a user fingerprint, in accordance with the form of a finger that touches the e-mail reception information 1330.

According to an embodiment, the electronic device 1300 may enlarge a fingerprint recognition region for the sake of user authentication. For example, when detecting a user's fingerprint image through a touch region of the e-mail reception information 1330, the electronic device 1300 may identify a size (or area) of the fingerprint image. When the size of the fingerprint image exceeds a reference size, the electronic device 1300 may perform user authentication utilizing the fingerprint image detected through the touch region of the e-mail reception information 1330. When the size of the fingerprint image is smaller than the reference size, the electronic device 1300 may determine that a reliability of the user authentication using the fingerprint image detected through the touch region of the e-mail reception information 1330 is deteriorated.

Figure 13D:
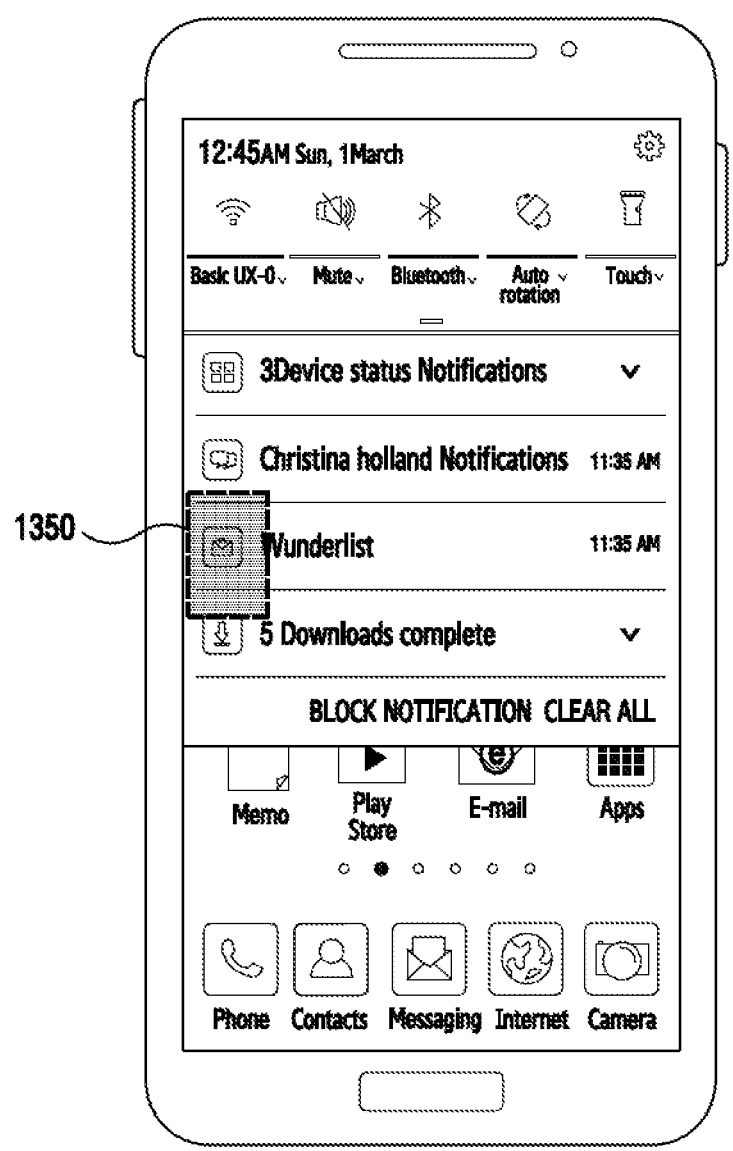
Figure 13E:
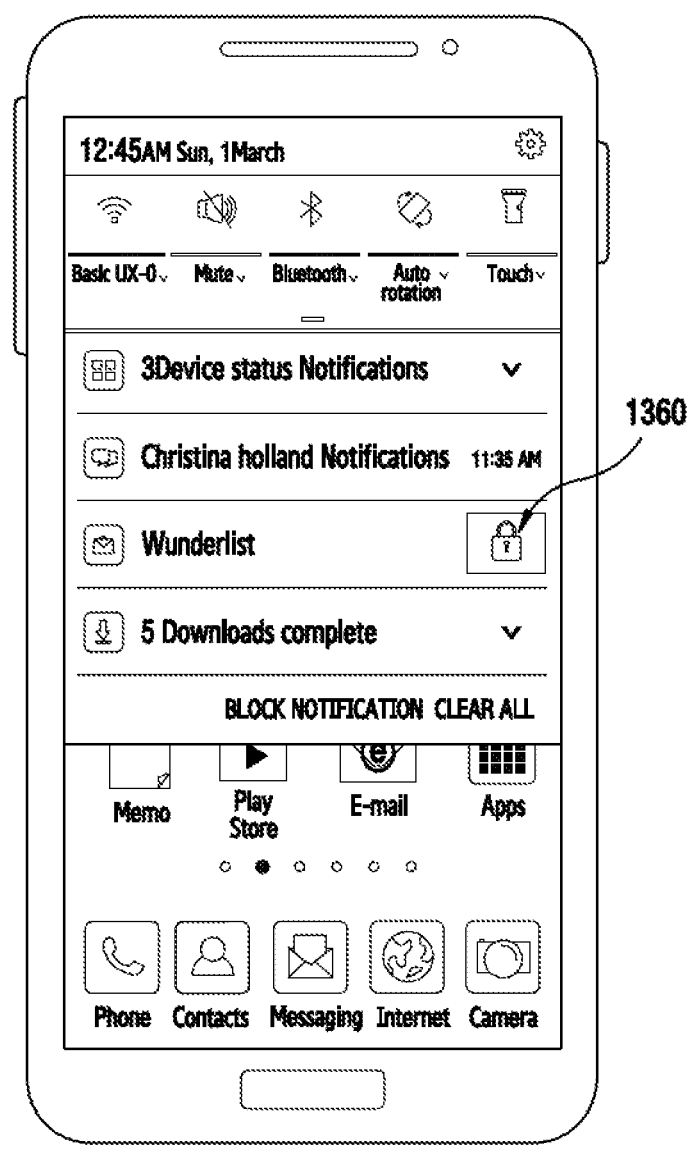

Referring to FIG. 13D, the electronic device 1300 may enlarge the size of the fingerprint recognition region 1350. For instance, the electronic device 1300 may display to distinguish the fingerprint recognition region from a remnant region so that the user may recognize the fingerprint recognition region.

According to an embodiment, as in FIG. 13D, the electronic device 1300 may additionally detect a user's fingerprint image through the enlarged fingerprint recognition region 1350. The processor 1300 may check whether a user is authenticated, by comparing the fingerprint image detected through the fingerprint recognition region 1350 and at least one reference fingerprint image previously stored in the memory. When authenticating the user through the fingerprint image, the electronic device 1300 may perform an operation or function mapped to the user authentication of the e-mail reception information 1330. For example, when succeeding in the user authentication through the fingerprint image detected through the fingerprint recognition region 1350, the electronic device 1300 may set a security for a received e-mail corresponding to the e-mail reception information 1330. According to an embodiment, as in FIG. 13E, the electronic device 1300 may additionally set a security and display an indication 1360 for the security. For instance, when a security has been set for the received e-mail corresponding to the e-mail reception information 1330, the electronic device 1300 may release security setting for the corresponding e-mail, based on the user authentication utilizing the fingerprint image detected through the fingerprint recognition region 1350 as well.

An electronic device and an operating method thereof according to various embodiments may activate at least a partial region of a finger scan sensor as a fingerprint recognition region, based on a selection input (e.g., touch input) of an object displayed at a display, and perform fingerprint recognition, thereby simplifying a user interface for the fingerprint recognition, and reducing power consumption caused by the fingerprint recognition.

An electronic device and an operating method thereof according to various embodiments may, when having succeeded in fingerprint authentication corresponding to a selection input for an object displayed at a display, provide various services having been set to the object, thereby providing various user interfaces utilizing a fingerprint.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted.

Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a finger scan sensor overlapped with at least a partial region of the display; and
   a processor, wherein the processor is configured to control to:
   detect a touch input corresponding to at least one object displayed at the display,
   if detecting a first fingerprint image in a fingerprint recognition region corresponding to the touch input by using the finger scan sensor, enlarge a size of the fingerprint recognition region,
   detect a second fingerprint image in the enlarged fingerprint recognition region by using the finger scan sensor, and
   if having succeeded in user authentication by using the second fingerprint image, perform a function corresponding to the at least one object.

2. The electronic device of claim 1, wherein the finger scan sensor is disposed to be overlapped with the entire region or at least partial region for detecting a touch input in the display.

3. The electronic device of claim 1, wherein the processor is further configured to control to:
   determine whether a fingerprint recognition event occurs based on touch information of the at least one object; and
   if detecting the occurrence of the fingerprint recognition event, set, as the fingerprint recognition region, at least a part of the finger scan sensor overlapped with a region where the touch input for the at least one object has been detected.

4. The electronic device of claim 3, wherein the processor is further configured to determine whether the fingerprint recognition event occurs based on at least one of a touch holding time of the at least one object, a touch area thereof, or a pressure intensity thereof.

5. The electronic device of claim 1, wherein the finger scan sensor is configured to activate the fingerprint recognition region, and deactivate a remnant region.

6. The electronic device of claim 1, wherein the processor is further configured to:
   determine whether a function corresponding to user authentication has been set to the at least one object in which the touch input has been detected; and
   if the function corresponding to the user authentication has been set to the at least one object in which the touch input has been detected, set, as the fingerprint recognition region, at least a part of the finger scan sensor overlapped with a region where the touch input for the at least one object has been detected.

7. The electronic device of claim 1, wherein the processor is further configured to:
   if detecting the first fingerprint image in the fingerprint recognition region corresponding to the touch input, identify a size of the first fingerprint image;
   determine whether to enlarge the fingerprint recognition region, based on the size of the first fingerprint image; and
   if determining to enlarge the fingerprint recognition region, control the finger scan sensor to enlarge the size of the fingerprint recognition region.

8. The electronic device of claim 7, wherein the processor is further configured to:
   if determining to not enlarge the size of the fingerprint recognition region, perform user authentication by using the first fingerprint image; and
   if having succeeded in the user authentication by using the first fingerprint image, perform a function corresponding to the at least one object.

9. The electronic device of claim 1, wherein the processor is further configured to:
   determine an enlargement size of the fingerprint recognition region based on a size of a predefined at least one reference fingerprint image for fingerprint recognition; and
   enlarge the size of the fingerprint recognition region to correspond to the enlargement size.

10. The electronic device of claim 1, wherein the processor is further configured to control the display to display the enlarged fingerprint recognition region.

11. An operating method of an electronic device, the method comprising:
    detecting a touch input corresponding to at least one object displayed at a display of the electronic device;
    determining whether a first fingerprint image is detected in a fingerprint recognition region corresponding to the touch input;
    if detecting the first fingerprint image, enlarging a size of the fingerprint recognition region;
    detecting a second fingerprint image in the enlarged fingerprint recognition region; and
    if having succeeded in user authentication by using the second fingerprint image, performing a function corresponding to the at least one object.

12. The method of claim 11, wherein the first fingerprint image comprises at least a part of the second fingerprint image.

13. The method of claim 11, wherein the determining of whether the first fingerprint image is detected comprises:
    determining whether a fingerprint recognition event occurs based on touch information of the at least one object;
    if detecting the occurrence of the fingerprint recognition event, setting, as the fingerprint recognition region, at least a part of the finger scan sensor overlapped with a region where the touch input for the at least one object has been detected; and
    determining whether the first fingerprint image is detected in the fingerprint recognition region.

14. The method of claim 13, wherein the touch information comprises at least one of a touch holding time of the at least one object, a touch area, or a pressure intensity.

15. The method of claim 11, wherein the determining of whether the first fingerprint image is detected comprises:

determining whether a function corresponding to user authentication has been set to the at least one object in which the touch input has been detected;

if the function corresponding to the user authentication has been set to the at least one object in which the touch input has been detected, setting, as the fingerprint recognition region, at least a part of the finger scan sensor overlapped with a region where the touch input for the at least one object has been detected; and determining whether the first fingerprint image is detected in the fingerprint recognition region.

16. The method of claim 11, wherein the enlarging of the size of the fingerprint recognition region comprises:

if detecting the first fingerprint image in the fingerprint recognition region corresponding to the touch input, identifying a size of the first fingerprint image;

determining whether to enlarge the fingerprint recognition region, based on the size of the first fingerprint image; and if determining to enlarge the fingerprint recognition region, enlarging the size of the fingerprint recognition region.

17. The method of claim 16, further comprising:

if determining to not enlarge the size of the fingerprint recognition region, performing user authentication by using the first fingerprint image; and if having succeeded in the user authentication by using the first fingerprint image, performing a function corresponding to the at least one object.

18. The method of claim 11, wherein the enlarging of the size of the fingerprint recognition region comprises:

determining an enlargement size of the fingerprint recognition region based on a size of a predefined at least one reference fingerprint image for fingerprint recognition; and enlarging the size of the fingerprint recognition region to correspond to the enlargement size.

19. The method of claim 11, further comprising:

if having failed in the user authentication utilizing the first fingerprint image or the second fingerprint image, performing a function corresponding to the touch input of the at least one object.

20. The method of claim 19, wherein the function corresponding to the touch input of the at least one object comprises a function which is different from the function corresponding to the at least one object carried out based on the user authentication.

* * * * *

UNITED STATES PATENT AND TRADEMARK OFFICE
CERTIFICATE OF CORRECTION

| | | |
|---|---|---|
| PATENT NO. | : 10,607,060 B2 | Page 1 of 1 |
| APPLICATION NO. | : 15/821269 | |
| DATED | : March 31, 2020 | |
| INVENTOR(S) | : Chaekyung Lee et al. | |

It is certified that error appears in the above-identified patent and that said Letters Patent is hereby corrected as shown below:

On the Title Page

In Column 1, item (54), Title, Lines 1-2 delete "AN", and replace with --AND--.

Signed and Sealed this
Twenty-third Day of June, 2020

Andrei Iancu
*Director of the United States Patent and Trademark Office*